(12) United States Patent
Tamura

(10) Patent No.: US 8,026,976 B2
(45) Date of Patent: Sep. 27, 2011

(54) DIGITAL CAMERA AND METHOD FOR CONTROLLING EMISSION AMOUNT OF FLASH

(75) Inventor: Kazunori Tamura, Asaka (JP)

(73) Assignee: FUJIFILM Corporation, Tokyo (JP)

(*) Notice: Subject to any disclaimer, the term of this patent is extended or adjusted under 35 U.S.C. 154(b) by 828 days.

(21) Appl. No.: 11/859,961

(22) Filed: Sep. 24, 2007

(65) Prior Publication Data
US 2008/0074536 A1    Mar. 27, 2008

(30) Foreign Application Priority Data

Sep. 22, 2006    (JP) .................................. 2006-257973

(51) Int. Cl.
*H04N 5/222* (2006.01)
(52) U.S. Cl. ........ 348/371; 348/370; 348/372; 348/373; 348/374
(58) Field of Classification Search .......... 348/370–376; 396/61, 62, 65–68, 106, 108, 124, 164–167, 396/204
See application file for complete search history.

(56) References Cited

U.S. PATENT DOCUMENTS

| | | | |
|---|---|---|---|
| 5,815,743 A | 9/1998 | Ohmori | |
| 7,573,505 B2 | 8/2009 | Kawaguchi et al. | |
| 2002/0041334 A1 | 4/2002 | Okawara | |
| 2003/0071908 A1 | 4/2003 | Sannoh et al. | |
| 2004/0047606 A1 | 3/2004 | Mikawa | |
| 2006/0044422 A1* | 3/2006 | Miyazaki | 348/234 |

FOREIGN PATENT DOCUMENTS

| | | | |
|---|---|---|---|
| JP | 09-105975 A | 4/1997 | |
| JP | 10-039192 A | 2/1998 | |
| JP | 2000-214518 A | 8/2000 | |
| JP | 2003-140219 A | 5/2003 | |
| JP | 2004-104429 A | 4/2004 | |
| JP | 2005-156967 A | 6/2005 | |
| JP | 2005-318554 A | 11/2005 | |
| JP | 2006-074164 A | 3/2006 | |

OTHER PUBLICATIONS

Notice of Grounds for Rejection, dated Apr. 5, 2011, issued in corresponding JP Application No. 2007-211251, 6 pages in English and Japanese.
Notice of Grounds for Rejection, dated May 17, 2011, issued in corresponding JP Application No. 2006-257973, 5 pages in English and Japanese.

* cited by examiner

*Primary Examiner* — Yogesh Aggarwal
(74) *Attorney, Agent, or Firm* — Sughrue Mion, PLLC

(57) ABSTRACT

A digital camera including an imaging unit, a flash device, a face region extraction unit for detecting a face region from image data generated by the imaging unit, and a flash control unit for controlling emission amount of the flash using the region information outputted from the face region extraction unit. The flash control unit includes a first calculation means for performing a calculation on the image data generated by the imaging unit without using the region information, a second calculation means for performing a calculation on the image data generated by the imaging unit using the region information, and an emission amount determination means for determining an adequate emission amount Ch of the flash by performing an adjustment using the provisional adequate value Cn supplied from the first calculation means and provisional adequate value Cf supplied from the second calculation means as reference values.

21 Claims, 21 Drawing Sheets

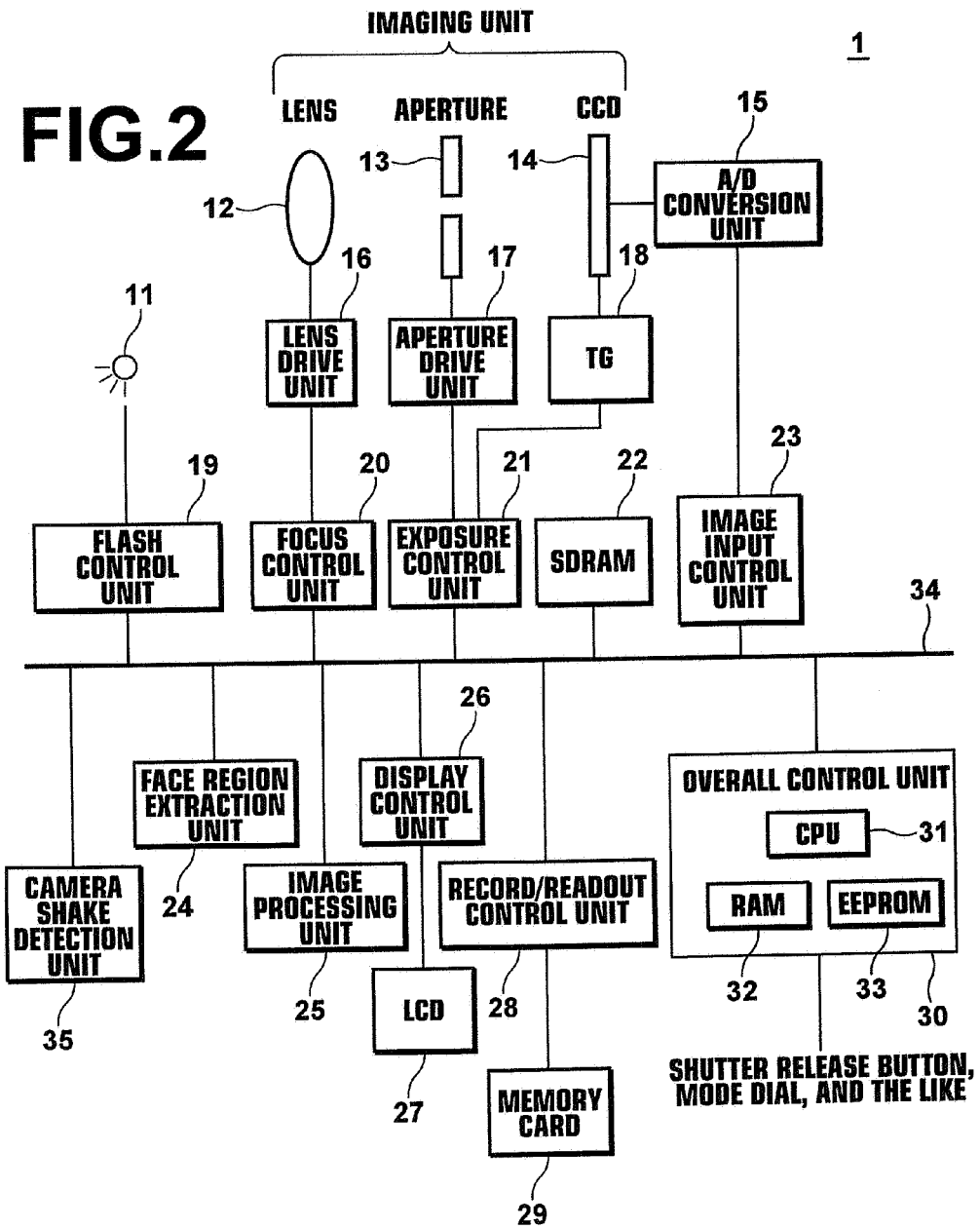

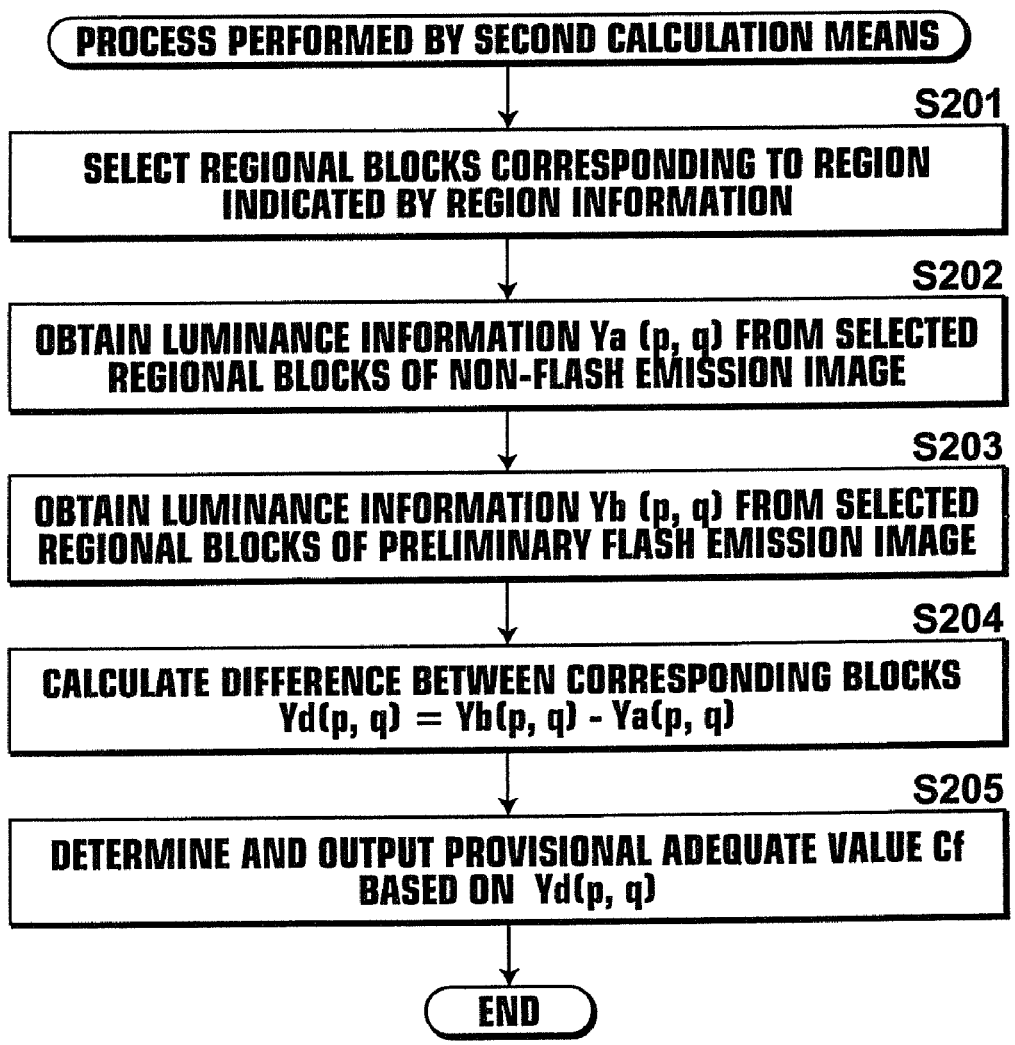

FACE INCLINATION

SHAKE AMOUNT

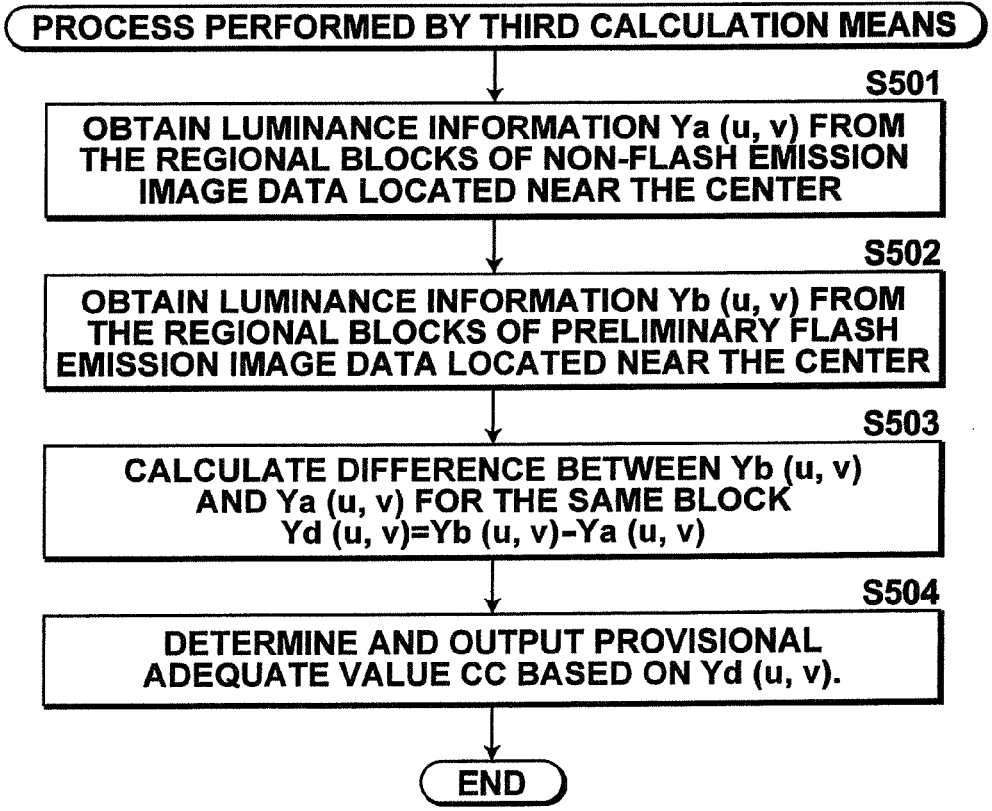
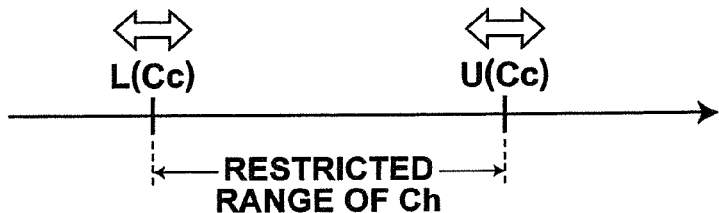

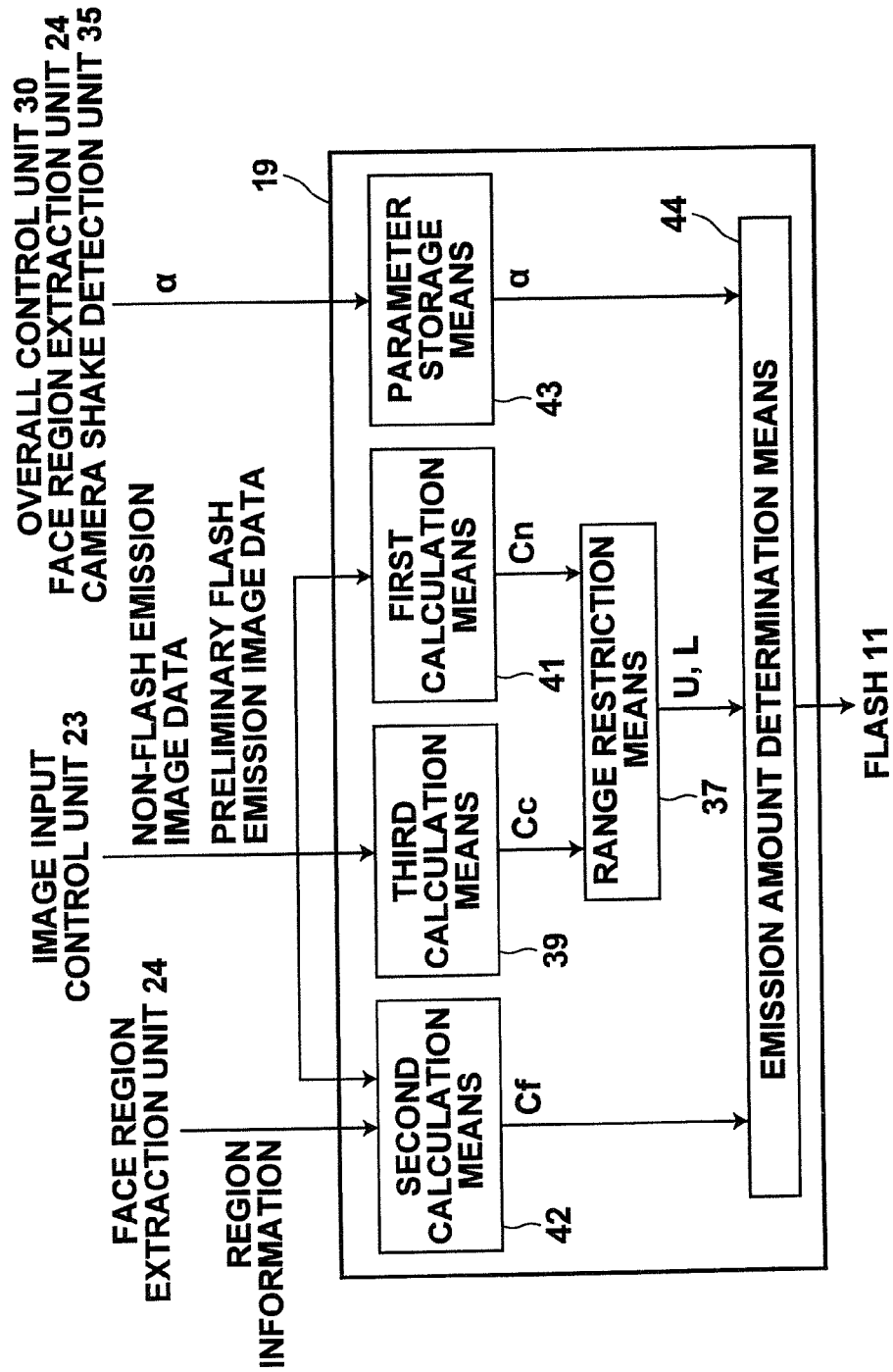

DIGITAL CAMERA AND METHOD FOR CONTROLLING EMISSION AMOUNT OF FLASH

BACKGROUND OF THE INVENTION

1. Field of the Invention

The present invention relates to a digital camera that controls the emission amount of a flash using face information included in a subject, and a method therefor.

2. Description of the Related Art

Generally, digital cameras initiate image taking before the shutter release button is depressed, and the exposure and focus adjustments are performed using the image obtained during that period. The image obtained during that period is also used for a flash adjustment to obtain an adequate emission amount of a flash. In the past, the method in which the adequate amount of flash is obtained based on the overall brightness of the obtained image has been commonly used. Recently, however, a flash adjustment method in which face detection is performed on the obtained image, and emission amount of the flash is controlled according to existence or nonexistence of a face, or the proportion of the detected face in the image.

For example, U.S. Patent Application Publication No. 20030071908 describes a method in which emission amount of a flash is reduced if a face is detected and the ratio of the face in the image is greater than or equal to a predetermined value. Further, U.S. Patent Application Publication No. 20060044422 describes a method in which emission amount of flash is obtained using only the image data of a region corresponding to a face in the image, or using image data in which a region corresponding to a face in the image is weighted greater than for the other regions.

The methods described in U.S. Patent Application Publication Nos. 20030071908 and 20060044422 may obtain an image of appropriate brightness without halation in the face portion or without the face portion becoming too dark, if a human face included in the subject is detected successfully. If, however, a human face included in the subject is not detected successfully, or a determination is made erroneously that a human face is included in the subject, the emission amount of the flash in flash photography becomes inadequate and an image of appropriate brightness is not obtained. Further, even when the face detection is successfully performed, if the subject in flash photography differs from the subject when the face detection was performed, the emission amount of the flash in the flash photography becomes inadequate.

SUMMARY OF THE INVENTION

The method described in U.S. Patent Application Publication No. 20060044422 has less impact of defective face detection result in comparison with other methods, since the amount of reflection light reflected from a region not including the face is also taken into account. Improper weighting, however, causes the emission amount of a flash to become inadequate in flash photography after all. U.S. Patent Application Publication No. 20060044422 does not clearly teach how to determine the weight in order to invariably obtain an adequate emission amount of a flash.

Further, U.S. Patent Application Publication No. 20060044422 illustrates only an emission control method in the case where a single face is included in the imaging scope, and does not describe an emission control method when a plurality of faces is detected. The methods described the aforementioned patent publications may be applied by assuming a plurality of regions as a single region, but this causes disadvantages. For example, if the total area exceeds a predetermined ratio, though the intensity of the reflection light from each of the faces is not so strong, the emission amount is reduced. It may be conceivable to select either one of a plurality of faces, such as the face located at a position nearest the center, and the method described in the aforementioned patent publication is applied to the selected face, but if the central face is small and faces on both sides are large, or if the central person has dark complexion and the persons on both sides have fair complexion, disadvantages, such as halation on the faces on both sides may result.

Still further, in the methods described in the patent publications described above, there is a time lag between the time when image data for face detection is obtained and the time when image data for flash adjustment, and if the subject or digital camera is moved during this time period, the obtained emission amount is not an optimum value. Movement of the face may cause the emission amount to be set to a more inadequate value compared to the case where the emission amount is obtained without considering the face, depending on the object located in the region where the face was detected as a result of the movement of the face.

Further, in the methods described in the aforementioned patent publications, disadvantages may arise when the imaging target is other than a human being. For example, when trying to imaging an animal or a building, a person is happened to be near the target object, and the emission amount of the flash is adjusted to the brightness of the face of the person, thereby halation may occur on the imaged target object or the target object becomes dark.

In view of these problems, it is a first object of the present invention to provide a digital camera capable of invariably performing flash emission with an appropriate emission amount.

Further, in the method describe in U.S. Patent Application Publication No. 20060044422, a weight is allocated to each of the regional blocks divided for flash adjustment. This requires the weight for each regional block to be controlled in order to finely control emission amount of a flash, so that the control operation becomes complicated. Complicated control requires a longer processing time, as well as complicated circuit structure and control program of the camera, therefore not desirable. In view of the problem described above, it is a second object of the present invention to provide a digital camera capable of controlling emission amount of a flash in a shorter time without requiring complicated circuit and control program.

The digital camera of the present invention includes: an imaging unit for generating image data representing a subject; a flash device for emitting a flash; a face region extraction unit (face detection unit) for detecting a face included in the image data generated by the imaging unit and outputting region information that indicates a region corresponding to the face; and a flash control unit for controlling emission amount of the flash using the region information outputted from the face region extraction unit.

In an embodiment of the present invention, the flash control unit includes: a first calculation means for performing a calculation on the image data generated by the imaging unit without using the region information outputted from the face region extraction unit to obtain a provisional adequate value Cn for the emission amount; a second calculation means for performing a calculation on the image data generated by the imaging unit using the region information outputted from the face region extraction unit to obtain a provisional adequate value Cf for the emission amount. The flash control unit further includes an emission amount determination means for determining an adequate emission amount Ch of the flash by performing an adjustment using the provisional adequate value Cn supplied from the first calculation means and provisional adequate value Cf supplied from the second calculation means as reference values.

The structure described above may use both the provisional adequate value Cn obtained through a flash adjustment without face consideration and provisional adequate value Cf obtained through a flash adjustment with face consideration, so that the adjustment for the adequate emission amount may be performed easily, and flash adjustment principles may be readily reflected in the determination of the emission amount. Further, in the structure described above, the first calculation means and second calculation means may constantly perform calculations using the same arithmetic expression, so that the circuit structure of the camera or program may be relatively simplified.

The digital camera according to an embodiment of the present invention further includes a parameter storage means for storing an influence α of the provisional adequate value Cf in the adjustment as a variable parameter, and the emission amount determination means calculates an average value of the provisional adequate value Cn, supplied from the first calculation means, and the provisional adequate value Cf, supplied from the second calculation means, in which the influence of the provisional adequate value Cf on the calculation result varies according to the value of the parameter stored in the parameter storage means. The referent of "average" as used herein means to equalize two values while keeping the balance in one way or another, and may include a square mean value, logarithmic mean value, weighted average, and the like, other than a simple average. This structure allows the influence of the provisional adequate value Cf in the determination of the emission amount to be readily increased or decreased by simply changing the value of the parameter.

Preferably, the value of the variable parameter is determined according to the ratio of the region indicated by the region information to the entire region of the image. For example, the parameter is set to a large value when the ratio of the extracted region to the entire region of the image is large and to a small value when the ratio is small. This allows the influence of the provisional adequate value Cf to be decreased when the influence of camera shake is likely to appear in the face detection result, and to be increased when it is not likely to appear in the face detection result. The appearance of the influence of camera shake may be predicted from the focal length, amount of camera shake detected by a camera shake detection means, or distance to the subject measured by a distance measuring means, so that the value of the parameter may be determined according to these values.

Further, the value of the variable parameter may be determined according to the position of the extracted region. This allows the control in which the influence of the provisional adequate value Cf in the emission amount adjustment is increased when the detected face locates in the center of the image, and decreased when the face locates in a peripheral portion of the image.

Still further, the value of the variable parameter may be determined according to the inclination or orientation of the detected face. The detection of a face image with inclined neck or side face image is difficult in comparison with a frontal face image, and the reliability of the detection result is low. The determination of the value of the variable parameter α ccording to the inclination or orientation of the face allows the influence of the provisional adequate value Ch to be decreased when the reliability of the detection result is low.

Further, in an embodiment of the present invention, the emission amount determination means limits possible values of the adequate emission amount Ch based on the provisional adequate value Cn. For example, the emission amount determination means sets the adequate emission amount Ch to an upper limit value, predetermined based on the provisional adequate value Cn, when the calculation result exceeds the predetermined upper limit value, and to a lower limit value, predetermined based on the provisional adequate value Cn, when the calculation result falls below the predetermined lower limit value. This may prevent the obtained emission amount from departing largely from the adequate range, even if an unexpected situation, such as erroneous face detection, should occur.

In another embodiment of the present invention, a calculation means of the flash control unit performs a calculation for each of N (integer number) faces detected by the face detection unit by regarding each face as the only face included in the image data and considering the face to obtain provisional adequate values Cfi ($1 \leq i \leq N$) for the emission amount. The referent of "calculation considering the face" as used herein means that the face detection result is used in the calculation for flash adjustment in one way or another. For example, the calculation means obtains a provisional adequate value Cfi using data within a region corresponding to a face detected in $i^{th}$ time only. Alternatively, the emission amount is obtained using the entire image data after allocating a greater weight to the data within the region corresponding to the face detected in $i^{th}$ time than other regions. This yields the number of provisional adequate values corresponding to the number of detected faces, i.e., N provisional adequate values Cf1 to CfN.

The emission amount determination means determines an adequate emission amount Ch of the flash by performing an adjustment using the N provisional adequate values Cf1 to CfN supplied from the calculation means as reference values. The referent of "performing an adjustment using the N provisional adequate values Cf1 to CfN" as used herein means that the emission amount is determined to a value within a range which would be adequate judging from the reference values. The adequate emission amount range for each face may be estimated from the provisional adequate value obtained for the face. Thus, if the emission amount is determined to a value within a range which is adequate in view of the respective reference values, halation may be prevented for each of the faces.

Preferably, a smallest provisional adequate value Cfmin is selected from the provisional adequate values Cfi ($1 \leq i \leq N$) supplied from the calculation means, and an adjustment is performed using the smallest provisional adequate value Cfmin as the reference value to determine the adequate emission amount Ch. The face with the smallest provisional adequate value is the face most likely to have halation. Thus, determination of the flash emission amount to a value which is not departed largely from the provisional adequate value Cfmin ensures halation to be prevented.

In another embodiment of the present invention, the flash control unit includes: an emission amount determination means for determining an emission amount of the flash by performing a calculation process capable of setting a face consideration level as a calculation parameter in the determination of the emission amount; and a parameter setting means for obtaining index data representing an influence level of movement of the digital camera or the subject on the determination of the emission amount, and setting the calculation parameter to a value determined based on the value of the index data.

In most cases, the calculation process is a process for obtaining the emission amount based on a result of face detection performed on one image data set generated by the imaging unit, and a required amount of light for the subject, i.e., an amount of light required for obtaining an image of the subject, estimated based on another image data set generated by the imaging unit. Thus, an embodiment is conceivable in which the parameter setting means obtains a time lag between the time point when the one image data set is generated and the time point when the another image data set is generated as the index data, and sets the calculation parameter such that the greater the time lag the smaller the face consideration level when the time lag is at least within a predetermined range.

For example, the digital camera may further include a time measuring means for measuring the time lag, and the calculation parameter may be set based on the time lag measured by the time measuring means. The measurement of the time lag may be performed by accurately measuring an elapsed time from the time point when image data for face detection are generated to the time point when image data for the estimation of required light amount. Alternatively, the measurement may be performed by detecting time points similar to the respective time points described above. For example, the elapsed time from the time point when a face is detected by the face detection process to the time point when the required amount of light is estimated.

Alternatively, data indicating an imaging mode set in the digital camera, or data indicating status of the digital camera may be obtained. Then, for example, the calculation parameter may be set such that the face consideration level becomes smaller for an imaging mode and/or status in which an image shake is more likely to occur. Alternatively, the calculation parameter may be set such that the face consideration level becomes smaller for an imaging mode and/or status in which the time lag is estimated to become greater. If accuracy has priority, it is preferable that the parameter be set based on the measured time. On the other hand, if the function described above is desired to be realized by a simple mechanism without much load on the digital camera, it is desirable that the value be set according to the imaging mode or status of the camera.

According to the structure described above, when performing flash adjustment, if a face position is displaced from the face position at the time of face detection, and the negative effect of the displacement on the determination of the emission amount is great, the influence of the data in a region extracted as the region corresponding to the face is kept low. Thus, even if the face position displacement occurs, a flash adjustment having at least an adjustment level identical to that when the adjustment is performed without considering the face may be performed, and flash imaging may be performed with an adequate emission amount though not optimum amount.

Further, in another embodiment of the present embodiment, the digital camera includes a first calculation means for performing a calculation on the image data generated by the imaging unit using the region information outputted from the face region extraction unit to obtain a provisional adequate value Cf for the emission amount, and a second calculation means for performing a calculation on the image data generated by the imaging unit to obtain a provisional adequate value Cc of the emission amount by discriminating a predetermined region of the image data from the region other than the predetermined region. Preferably, the second calculation means is a means discriminating, for example, a central portion from a peripheral portion of the image. Further, the digital camera includes a range restriction means for restricting a possible value range of adequate emission amount Ch based on the provisional adequate value Cc supplied from the second calculation means, and an emission amount determination means for determining the adequate emission amount Ch of the flash by performing an adjustment using the provisional adequate value Cf supplied from the first calculation means as the reference value within the range restricted by the rang restriction means. For example, the range restriction means determines an upper limit value and/or a lower limit value of the adequate emission amount Ch. It is preferable that the adequate emission amount of the flash be determined to an amount capable of irradiating an amount of light required by the subject. The amount of light required by the subject varies with the reflectance of the subject, brightness of the subject, and the distance from the digital camera to the subject. Generally, the amount of light reflected from the subject becomes small as the distance becomes long, or the subject has a low reflectance, so that a large amount of light is required to be irradiated on the subject. Further, if the subject is dark, a large amount of light is required to compensate for the difference from the appropriate exposure. Consequently, the value of the adequate emission amount obtained through the calculation differs depending on the main target for the calculation even when the same scope is imaged. In the structure described above, a calculation considering a face is performed using the region information outputted from the face region extraction means, but at the same time, another calculation is also performed considering an object which is highly likely the intended imaging target, such as the subject located in the center. Therefore, a certain restriction may be applied to the calculation result considering the face. This allows the flash emission amount to a value not departing largely from the adequate emission amount regardless of whether the detected face is the main subject or the one just accidentally included in the imaging scope with the main subject locating at another place.

Here, an arrangement may be made in which the digital camera includes a third calculation means for performing a calculation on the image data generated by the imaging unit without discriminating a particular region to obtain a provisional adequate value Cn of the emission amount, and the range restriction means determines the upper limit value and/or the lower limit value of the adequate emission amount to a value within a range restricted based on the provisional adequate value Cn supplied from the third calculation means. This prevents the upper and lower limit values of the adequate emission amount Ch to be set to excessive values, and the flash emission amount is determined to an adequate value even if the subject located in the center or the like is actually not the object to be considered.

BRIEF DESCRIPTION OF THE DRAWINGS

FIG. 2 illustrates an internal structure of the digital camera.

FIG. 6A is a flowchart illustrating a process performed by the second calculation means when a single face is detected.

FIG. 20 is a flowchart illustrating a process performed by the third calculation means.

FIG. 21 illustrates limitation of emission amount.

FIG. 22 illustrates still another example structure of the flash control unit and input/output data thereof.

DESCRIPTION OF THE PREFERRED EMBODIMENTS

Hereinafter, as exemplary embodiments of the present invention, single-lens reflex digital cameras having flash photography functions and methods for controlling emission amount of the flash of the digital cameras will be described.

Structure of the Digital Camera

Figure 1A:
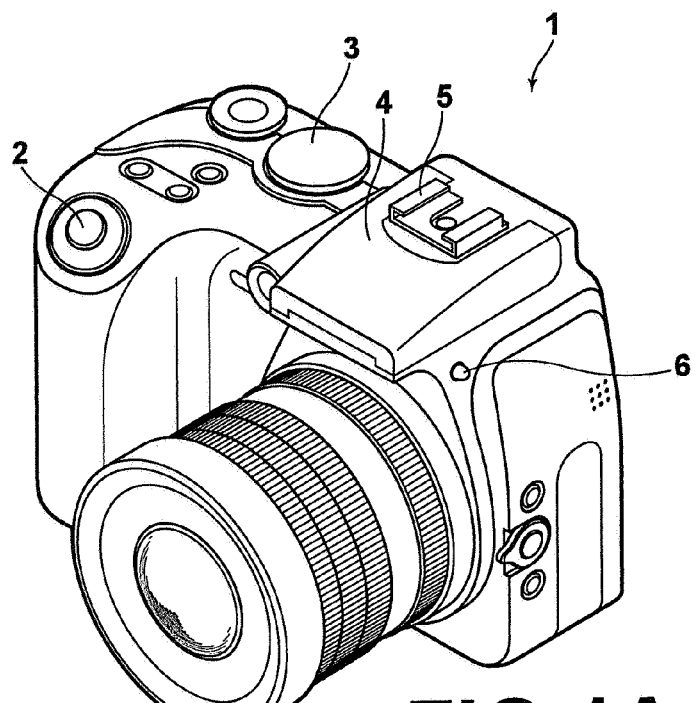
FIG. 1A is an overview of the digital camera according to an embodiment of the present invention (normal view).
Figure 1B:
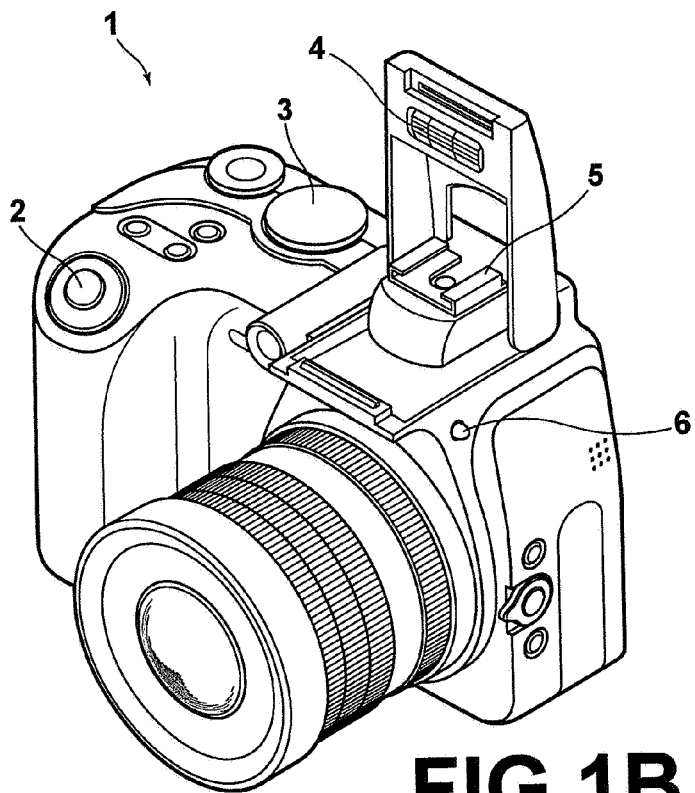
FIG. 1B is an overview of the digital camera according to an embodiment of the present invention (view with a built-in flash being popped up).
Figure 1C:
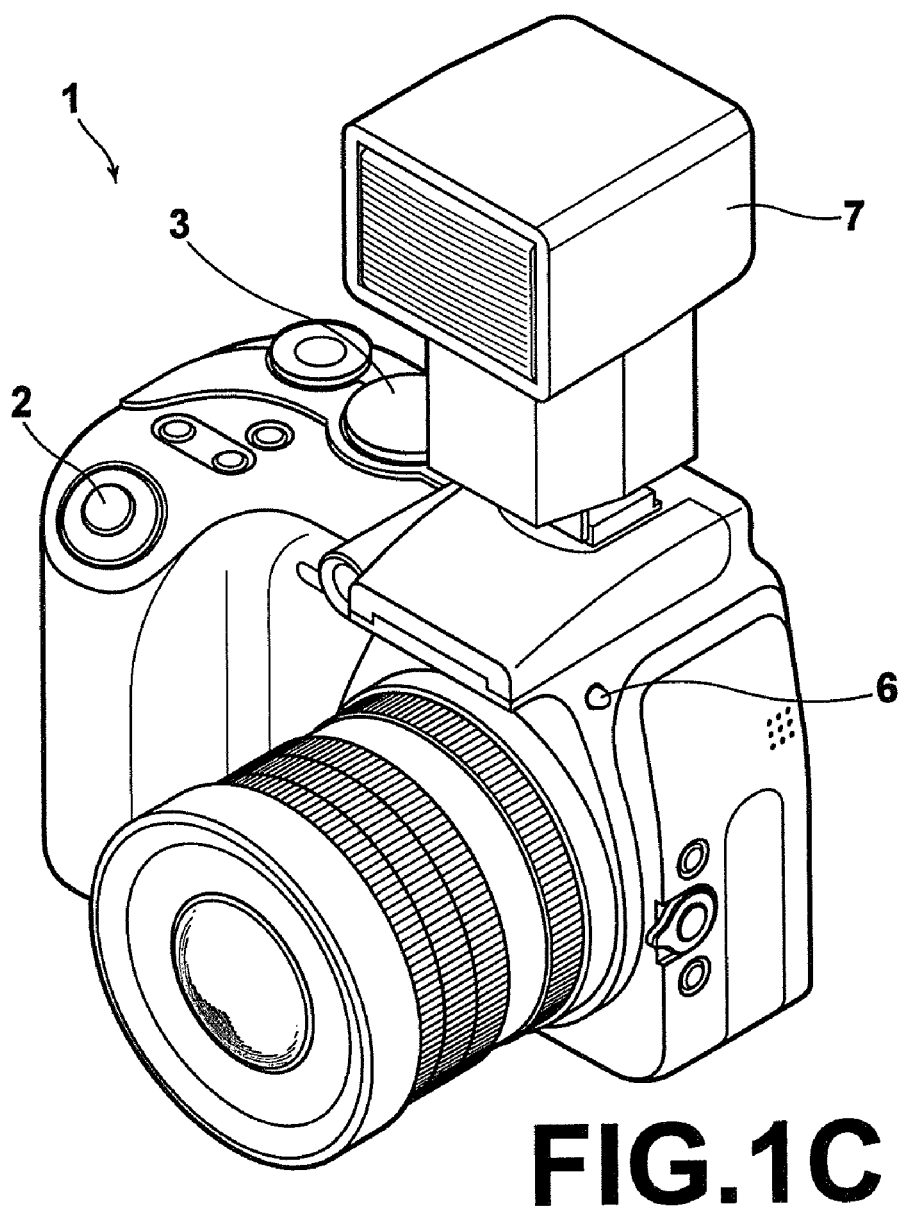
FIG. 1C is an overview of the digital camera according to an embodiment of the present invention (view with an external flash being attached).

FIGS. 1A to 1C illustrate overviews of a digital camera 1 according to an embodiment of the present invention. As illustrated in FIG. 1A, the digital camera 1 includes, on the upper side thereof, a shutter release button 2, a mode dial 3 for selecting an imaging mode, a built-in flash 4, and a hot shoe 5, which is a receptacle for attaching an accessory.

The shutter release button 2 has a two-step mechanism to allow two different operational instructions to be given. For example, in photography using an auto exposure (AE) function and auto focus (AF) function, the digital camera 1 performs preparatory operations for the photography, such as exposure control, focus adjustment, and the like, when the shutter release button 2 is lightly depressed (halfway depression). Under this state, when the shutter release button 2 is depressed strongly (full depression), the digital camera 1 initiates the exposure and records image data corresponding to a single screen obtained by the exposure in a memory card.

The built-in flash 4 swings up (pops up) when a flash pop up button 6, provided on the side, is depressed, as illustrated in FIG. 1B. Further, the flash pops up automatically in a certain imaging mode. The popped up built-in flash 4 emits light two times in conjunction with a second-step depression of the shutter release button 2. The first emission is a preliminary flash emission for measuring the amount of light reflected back from a subject, and is small in amount in comparison with an ordinary emission. Another purpose of the preliminary flash emission is to prevent a redeye phenomenon, other than the reflected light amount measurement. The second emission is a real emission for supplying a sufficient amount of light to the subject for photography (for obtaining an appropriate amount of exposure), and if the emission amount in real emission is appropriate, an image of adequate brightness may be obtained.

The operation of the built-in flash 4 depends not only on the operation of the shutter release button 2, but also on the imaging mode selected by the mode dial 3 and flash emission mode set on the setting screen. Imaging modes include "AUTO" in which all of the settings for photography are set automatically by the camera, "MANUAL" in which all of the settings for photography are set manually by a user. Further, "Program Auto", "Shutter-Priority Auto", "Aperture-Priority Auto", "Picture Stabilization (Anti-Shake)", "Natural Light & With Flash", "Natural Photo", "Portrait", "Landscape", "Night Scene", and the like are provided as the imaging mode. As for the flash emission mode, "AUTO Flash", "Forced Flash", "Slow Synchronization", "Redeye Reduction", "Redeye Reduction+Slow Synchronization", and the like are provided.

The digital camera 1 set to "AUTO" mode as the imaging mode, and to "AUTO Flash" as the flash emission mode causes the built-in flash to pop up automatically and to emit a flash emission in conjunction with the shutter release button 2, if it determines that flash photography is required. On the other hand, the "Natural Photo" is a mode in which non-flash emission photography is performed. Therefore, in the digital camera 1 set to this mode, the operation of the shutter release button 2 does not cause the built-in flash 4 to operate. The digital camera 1 set to "Redeye Reduction" or to "Redeye Reduction+Slow Synchronization" for the flash emission mode performs redeye reduction emission for preventing a redeye phenomenon by contracting the pupils of a subject. The digital camera 1 set to "Portrait" for the imaging mode also performs the redeye reduction emission automatically if a predetermined condition is satisfied. Also, in each of the other modes, the operation of the built-in flash 4 is predetermined so as to meet the purpose of the mode.

In the digital camera 1, an external flash 7 may be attached to the hot shoe 5 and used, as illustrate in FIG. 1C. The external flash 7 is mechanically and electrically connected to the digital camera 1 when attached to the hot shoe 5, and emits a flash emission according to the mode selected by the mode dial 3 in conjunction with a second-step depression of the shutter release button 2, as in the built-in flash 4. Hereinafter, description will be made focusing on the example embodiment illustrated in FIGS. 1A and 1B, but the present invention is applicable to any digital camera regardless of whether the flash is a built-in or external type.

Next, the internal structure of the digital camera 1 will be described briefly by referring to FIG. 2. As illustrated in FIG. 2, the digital camera 1 has an imaging system which includes a lens 12, a lens drive unit 16, an aperture 13, an aperture drive unit 17, a CCD 14, and a timing generator (TG) 18. The lens 12 includes a plurality of functional lenses, including a focus lens for focusing the camera onto a subject, a zoom lens for realizing a zoom function, and the like. The lens drive unit 16 includes a small motor, such as a stepping motor, and controls the position of each of the functional lenses so that the distance of the lens from the CCD 14 meets the purpose of the lens. The aperture 13 includes a plurality of aperture blades. The aperture drive unit 17 includes a small motor, such as a stepping motor, and controls the positions of the aperture blades so that the opening size of the aperture meets the purpose of the aperture. The CCD 14 is a CCD with five million to twelve million pixels, having primary color filters, and outputs stored charges in response to an instruction signal from the timing generator 18. The timing generator 18 sends a signal to the CCD 14 to cause the CCD 14 to store charges therein only during a desired time period, thereby the shutter speed is controlled.

The digital camera 1 further includes: an A/D converter unit 15 for converting output signals of the CCD 14 to digital signals; an image input control unit 23 for transferring image data outputted from the A/D converter unit 15 to other processing units through a system bus 34; and a SDRAM 22 for tentatively storing image data transferred from the image input control unit 23. The image data stored in the SDRAM 22 are RAW format data.

The digital camera 1 further includes: a flash 11; a flash control unit 19 for controlling the timing and emission amount of the flash 11; a focus control unit 20 for focusing a lens by instructing the lens drive unit 16 to move the lens; an exposure control unit 21 for determining the aperture value and shutter speed, and sending the instruction signal to the aperture drive unit 17 and timing generator 18; and a face region extraction unit 24 for performing face detection on the image data stored in the SDRAM 22, and outputting a value indicating whether or not a face is detected, and, if a face is detected, information indicating a region corresponding to the face (region information). The flash control unit 19, focus control unit 20, and exposure control unit 21 may sometimes perform processing with reference to the face detection result performed by the face region extraction unit 24, as well as the image data stored in the SDRAM 22. As for the method for controlling exposure and focus with reference to the face detection result, a method as described, for example, in U.S. Patent Application Publication No. 20030071908 may be used. Whether or not the flash control unit 19, focus control unit 20, and exposure control unit 21 refer to the face detection result outputted from the face region extraction unit 24 depends on the selected imaging mode and other setting values.

The digital camera 1 further includes an image processing unit 25 for performing image processing on the image data stored in the SDRAM 22. The image processing unit 25 performs various finishing processes for making the image attractive, including color tone and brightness corrections, as well as a redeye defect correction if included, and stores back the processed image data in the SDRAM 22 again.

The digital camera 1 further includes a display control unit 26 for controlling output of the image data stored in the SDRAM 22 to a liquid crystal display (LCD) 27. The display control unit 26 performs pixel skipping on the image data stored in the SDRAM 22 in order to make the image data to an appropriate size for display before outputting to the liquid crystal display 27.

The digital camera 1 further includes a record/readout control unit 28 for controlling recording of the image data stored in the SDRAM 22 to a memory card 29, and loading of image data recorded in the memory card 29 to the SDRAM 22. The record/readout control unit 28 records the RAW data directly to the memory card 29, or after converting to JPEG data through an image compression coding technique depending on user setting. More specifically, the record/readout control unit 28 records an Exif (Exchangeable Image File Format) file including image data and auxiliary information of the image data in the memory card 29. When loading JPEG image data to the SDRAM 22, the image data readout from the file are decoded and loaded into the SDRAM 22.

The digital camera 1 further includes a camera shake detection unit 35 formed of a gyrosensor or the like. When a camera shake is detected during photography, the camera shake detection unit 35 supplies information indicating the amount of detected shake to the flash control unit 19, exposure control unit 21, and image processing unit 25. When a camera shake is detected, the exposure control unit 21 sets the shutter speed faster than the case where a camera shake is not detected to alleviate the effect of camera shake on the image to be obtained. When a camera shake is detected, the image processing unit 25 performs image processing for correcting the camera shake on the obtained image data.

The digital camera 1 further includes a distance measurement function for measuring the distance to the subject from the digital camera 1. The distance measurement function may be realized by providing a distance sensor on the front face of the digital camera. But, in the present embodiment, the distance to the subject is determined based on the positional information of the focus lens and the number of drive pulses of the focus lens.

The digital camera 1 further includes an overall control unit 30 which includes a CPU (Central Processing Unit) 31, a RAM (Random Access Memory) 32 having therein an operational/control program, and EEPROM (Electrically Erasable and Programmable Read Only Memory) 33 having therein various setting values. The overall control unit 30 detects the imaging mode selected through the mode dial and other user setting operations, and causes the setting contents to be stored in the EEPROM 33. Then, according to the setting values stored in the EEPROM 33, the overall control unit 30 sends signals instructing the processes to be performed and execution timings of the processes to the flash control unit 19, focus control unit 20, exposure control unit 21, image input control unit 23, face region extraction unit 24, image processing unit 25, display control unit 26, and record/readout control unit 28 through the system bus 34 when the setting operation or imaging operation is performed.

Control of Flash Emission Amount

Figure 3:
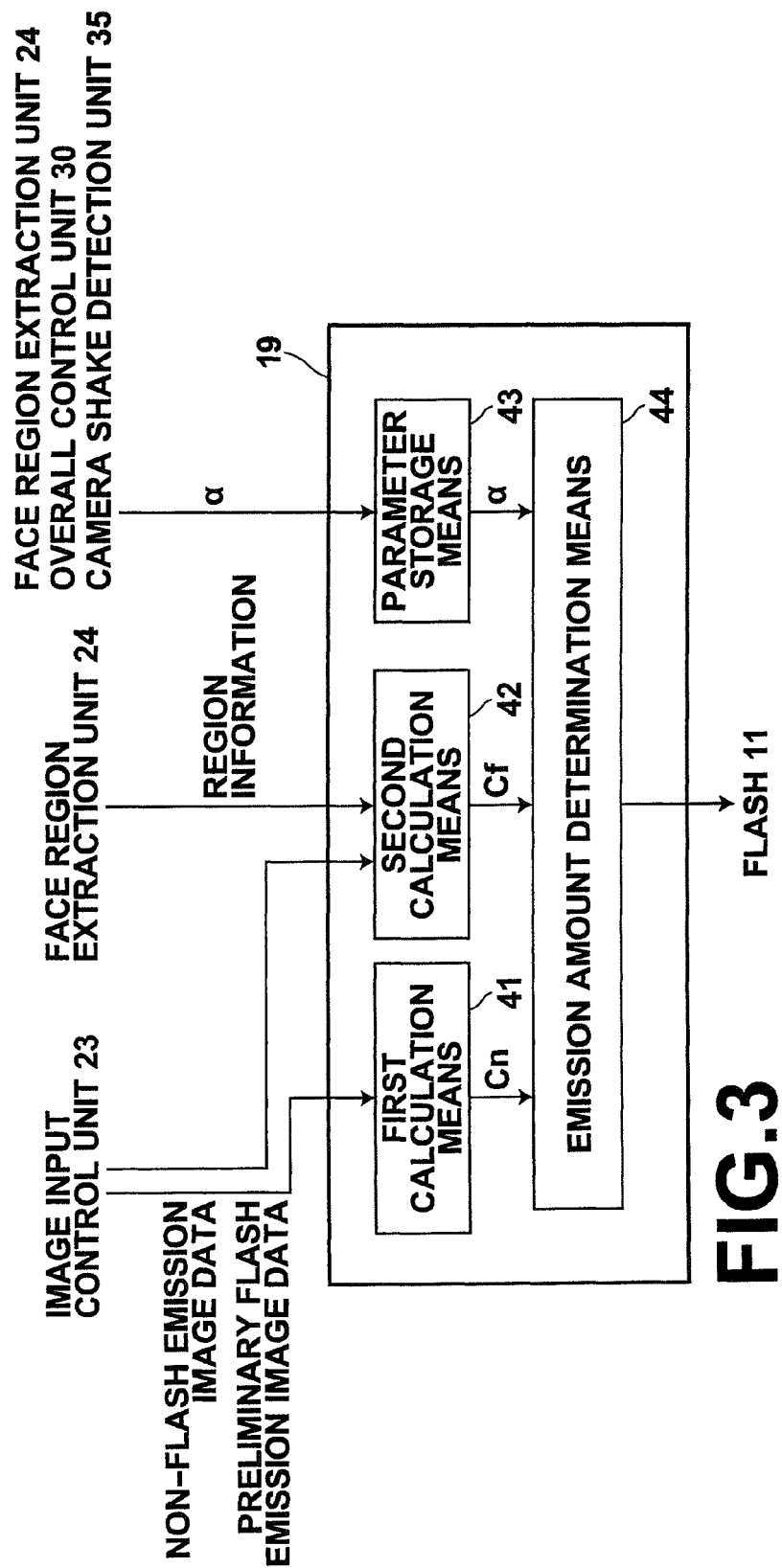
FIG. 3 illustrates an example structure of the flash control unit and input/output data thereof.

FIG. 3 illustrates a structure of the flash control unit 19 and input/output data thereof. As illustrated in FIG. 3, the flash control unit 19 includes a first calculation means 41, a second calculation means 42, a parameter storage means 43, and an emission amount determination means 44. The first calculation means 41, second calculation means 42, and emission amount determination means 44 are arithmetic circuits for performing arithmetic operations to be described later, and the parameter storage means 43 is an EEPROM. Note that the parameter storage means 43 is not necessarily the constituent element of the flash control unit 19. For example, the EEPROM 33 in the overall control unit 30 may be used as the parameter storage means 43.

The first calculation means 41 receives non-flash emission image data and preliminary flash emission image data from the image input control unit 23 under control of the overall control unit 30. The preliminary flash emission image data are image data obtained by the imaging unit in synchronization with a preliminary flash emission performed by the flash 11 under control of the overall control unit 30. The non-flash emission image data are image data obtained by the imaging unit immediately preceding or after the preliminary flash emission. The first calculation means 41 obtains and outputs a provisional adequate value Cn for flash emission amount without face consideration by performing an arithmetic operation to be described later using these two types of images. The referent of "flash adjustment with face consideration" as used herein means a flash adjustment that uses output of the face region extraction unit 24 in one way or another in the arithmetic operation for flash adjustment, and the referent of "flash adjustment without face consideration" as used herein means a flash adjustment that does not use output of the face region extraction unit 24 in the arithmetic operation for flash adjustment.

The second calculation means 42 receives non-flash emission image data and preliminary flash emission image data from the image input control unit 23 under control of the overall control unit 30, as in the first calculation means 41. In addition, the second calculation means 42 receives region information indicating a region corresponding to a face from the face region extraction unit 24. If a plurality of faces is detected by the face region extraction unit, the second calculation means 42 receives the number of region information corresponding to the number of detected faces. Then, the second calculation means 42 obtains and outputs a provisional adequate value Cf for flash emission amount with face consideration by performing an arithmetic operation to be described later using these two types of images and the region information. If a plurality of region information is received, the second calculation means 42 performs calculation for each region, i.e., each face, to obtain and output provisional adequate values Cf1 to CfN.

Parameter α stored in the parameter storage means 43 is a variable parameter which may be set by the face region extraction unit 24 or camera shake detection unit 35. Alternatively, parameter α may be set by the overall control unit 30 by receiving output of the extraction unit 24 or camera shake detection unit 35. When the parameter is set by the face region extraction unit 24, a single value is set to each extracted region.

The emission amount determination means 44 determines the emission amount in real emission using the provisional adequate value Cn outputted from the first calculation means 41, provisional adequate value Cf or provisional adequate values Cf1 to CfN outputted from the second calculation means 42, and parameter α read out from the parameter storage means 43, and controls the emission amount of the flash 11.

Figure 4A:
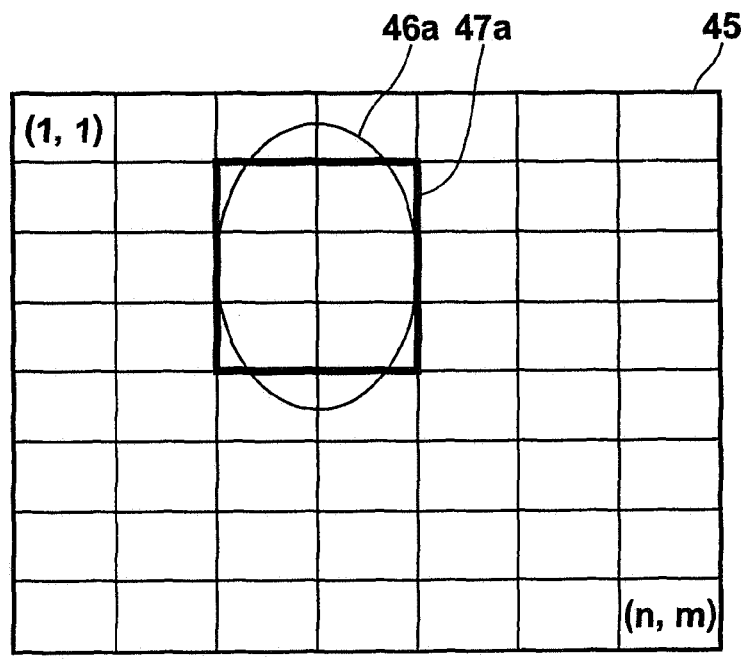
FIG. 4A illustrates an example image data, including a single face, divided into regional blocks.
Figure 4B:
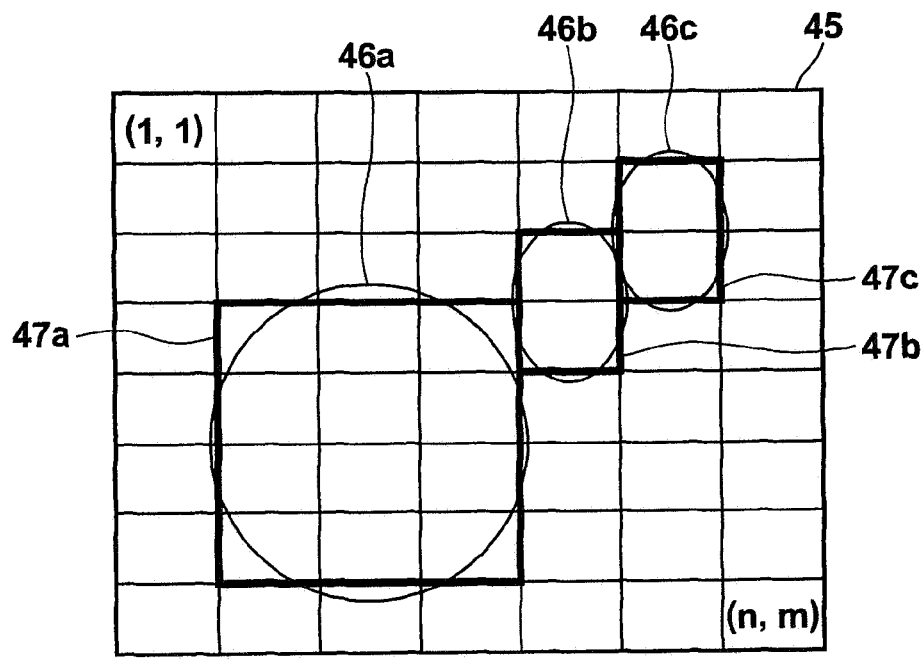
FIG. 4B illustrates an example image data, including a plurality of faces, divided into regional blocks.

Hereinafter, processes performed by the first calculation means 41, second calculation means 42, and emission amount determination means 44 will be described in further detail. The first calculation means 41 and second calculation means 42 divide the inputted non-flash emission image data and preliminary flash emission image data into a plurality of regional blocks. FIGS. 4A and 4B illustrate an example division of regional blocks, in which image data 45 (non-flash emission image data or preliminary flash emission image data) are divided into n×m regional blocks. In the following description, regional blocks located in different positions will be identified by example designations from (1, 1) to (n, m) illustrated in FIG. 4.

Figure 5:
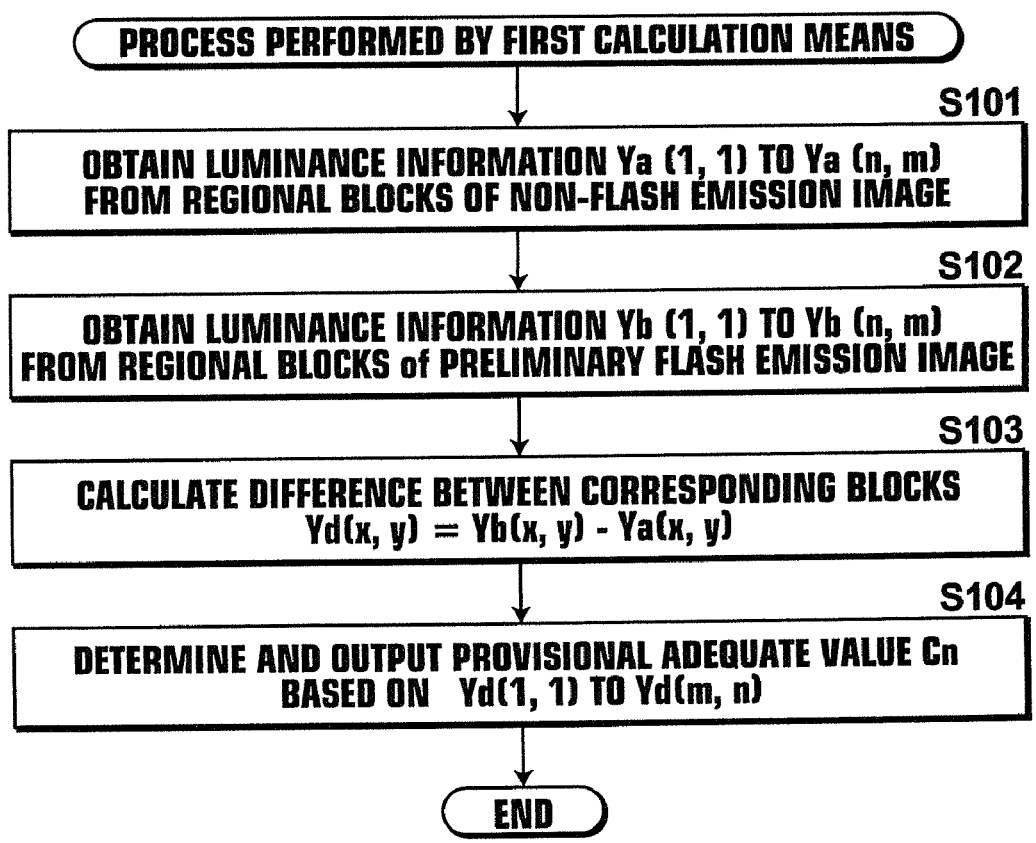
FIG. 5 is a flowchart illustrating a process performed by the first calculation means.

FIG. 5 is a flowchart illustrating a process performed by the first calculation means 41. The first calculation means 41 obtains luminance information Ya (1, 1) to Ya (n, m) from regional blocks of non-flash emission image data (S101). For example, the first calculation means 41 converts the non-flash emission image data from RGB to YCC to obtain luminance values of the respective pixels, and averages the luminance values with respect to each of the regional blocks, and the average value of each regional block is used as the luminance information Ya. For preliminary flash emission image data, the first calculation means 41 obtains luminance information Yb (1, 1) to Yb (n, m) from the respective regional blocks in the same manner as described above (S102).

Then, the first calculation means 41 calculates the difference Yd (x, y) between the luminance information Yb (x, y) obtained in step S102 and luminance information Ya (x, y) obtained in step S101 for each regional block (S103). Then, the first calculation means 41 determines and outputs an adequate value for the emission amount without face consideration (provisional adequate value Cn) based on the differences Yd (1, 1) to Yd (n, m) of all of the regional blocks (S104). For example, the first calculation means 41 estimates an intensity of reflection light reflected from the subject per unit amount of emission through simple or weighted averaging of the differences Yd (1, 1) to Yd (n, m), and thereby obtains a emission amount which results in a reflection light intensity that may provide an optimum exposure, which is used as the provisional adequate value Cn. When obtaining a weighted average value of the differences Yd (1, 1) to Yd (n, m), face-independent weighting is performed, e.g., allocating greater weights to regional blocks located near the center of the image.

FIG. 6A is a flowchart illustrating a process performed by the second calculation means 42 when a single face is detected. The second calculation means 42 selects a regional block group 47a corresponding to a region 46a indicated by the region information supplied from the face region extraction unit 24, as illustrated in FIG. 4A (S201). For example, the second calculation means 42 calculates an area of each regional block overlapping with the region 46a, and selects a regional block group 47a, each block having an area overlapping with the area 46a more than or equal to half of the entire region. Then, the second calculation means 42 obtains luminance information Ya (p, q) from the selected regional blocks of the non-flash emission image data (S202). Further, the second calculation means 42 obtains luminance information Yb (p, q) from the selected regional blocks of the preliminary flash emission image data (S203).

Then, the second calculation means 42 calculates the difference Yd (p, q) between the luminance information Yb (p, q) obtained in step S203 and luminance information Ya (p, q) obtained in step S202 for each selected regional block (S204). Then, the second calculation means 42 determines and outputs an adequate value for the emission amount with face consideration (provisional adequate value Cf) based on the differences Yd (p, q) of the selected regional blocks (S205). For example, in the example case illustrated in FIG. 4A, six blocks are selected, so that the second calculation means 42 determines the provisional adequate value Cf based on Yd (p1, q1) to Yd (p6, q6). For example, the second calculation means 42 estimates an intensity of reflection light reflected from the subject per unit amount of emission through simple averaging to obtain an emission amount which results in a reflection light intensity that may provide an optimum exposure, i.e., an emission amount capable of supplying light corresponding to a light amount required by the subject, which is used as the provisional adequate value Cf.

The emission amount determination means 44 determines an adequate emission amount Ch of the flash 11 by performing an adjustment using the provisional adequate value Cn outputted from the first calculation means 41 and provisional adequate value Cf outputted from the second calculation means 42 as reference values. In the present embodiment, the emission amount is adjusted according to the parameter α stored in the parameter storage means 43. More specifically, the emission amount determination means 44 determines the adequate emission amount Ch by performing a calculation based on Formula (1) below.

$$\text{Adequate Emission Amount } Ch = Cn \times (1-\alpha) + Cf \times \alpha \quad (1)$$

In the method described above, the provisional adequate value Cn obtained through the adjustment of emission amount without face consideration, and the provisional adequate value Cf obtained through adjustment of emission amount with face consideration serve as the reference values in controlling the emission amount of the flash. The calculations using the reference values may directly reflect the adjustment of emission amount principle of to what extent the face is to be considered in obtaining the emission amount, so that the adjustment of emission amount principle may be easily reflected in the emission amount control, which facilitates designing of the digital camera.

In particular, as illustrated in Formula (1) above, if an adequate emission amount Ch is obtained by calculating a weighted average of a provisional adequate value Cn obtained through flash adjustment without face consideration and a provisional adequate value Cf obtained through flash adjustment with face consideration, the influence of the provisional adequate value Cf in the adjustment of emission amount may be readily increased or decreased by simply changing the value of the parameter α. The first calculation means 41 and second calculation means 42 constantly perform calculations based on the same arithmetic expression, so that the circuit structures of the first calculation means 41 and second calculation means 42, or programs may be simplified in comparison with the case in which a plurality of different arithmetic expressions is used separately according to flash adjustment principles. Further, the flash adjustment principle may be changed by simply changing the value of the parameter α, so that the processing results of the face region extraction unit 24 and other processing units may be readily reflected in the flash adjustment. Thus, the flash adjustment may readily respond to changes in the situation during photography, which allows careful and meticulous control of the emission amount of the flash.

Emission Amount Control when a Plurality of Faces are Detected

Figure 6B:
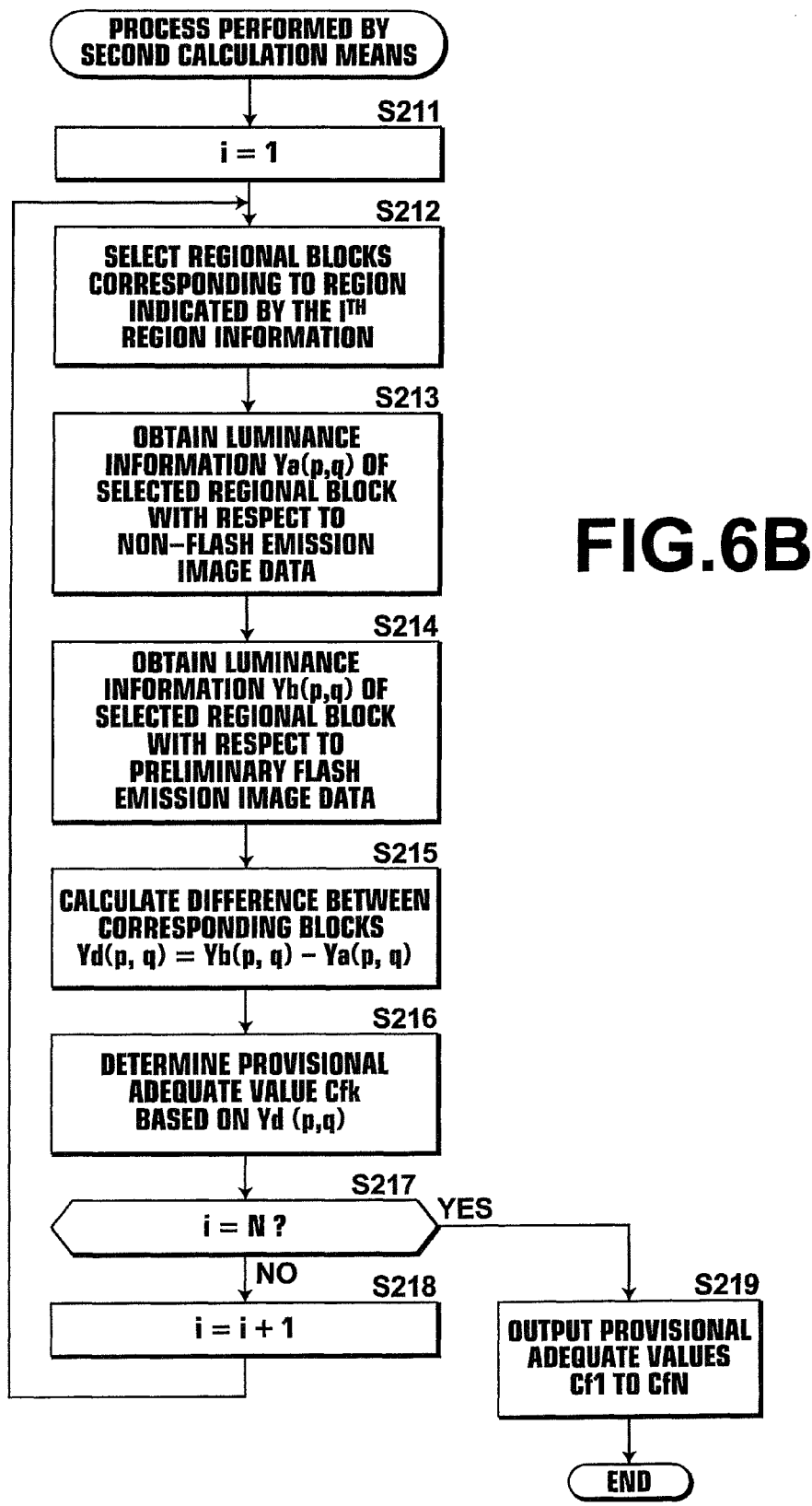
FIG. 6B is a flowchart illustrating a process performed by the second calculation means when a plurality of faces is detected.

FIG. 6B is a flowchart illustrating a process performed by the second calculation means 42 when a plurality of faces is detected. Hereinafter, the process steps when three regions 46a, 46b, and 46c are extracted, as illustrated in FIG. 4B, by the face region extraction unit 24 will be described as an example. First, the second calculation means 42 initializes the value of the counter i to 1 (S211). Then, it selects a regional block group 47a corresponding to the region 46a indicated by the $i^{th}$ region information (here, the first region information) (S212). Thereafter, the second calculation means 42 obtains luminance information Ya (p, q) of the selected regional blocks with respect to non-flash emission image data (S213). It further obtains luminance information Yb (p, q) of the selected regional blocks with respect to preliminary flash emission image data (S214). In the example illustrated in FIG. 4B, the block group 47a selected for the region 46a includes 12 regional blocks, so that the second calculation means 42 obtains luminance information Ya (p1, q1) to Ya (p12, q12) and Yb (p1, q1) to Yb (p12, q12) for the 12 blocks.

Then, the difference Yd (p, q) between the luminance information Yb (p, q) obtained in the step S214 and the luminance information Ya (p, q) obtained in the step S213 is calculated for each of the selected blocks (S215), and an adequate value of the flash emission amount (provisional adequate value Cf1) based on the difference Yd (p, q) obtained for the selected regional blocks (S216). In the example illustrated in FIG. 4B, differences Yd (p1, q1) to Yd (p12, q12) are obtained for the 12 blocks, and the provisional adequate value Cf1 is determined based on these differences. For example, For example, the second calculation means 42 estimates an intensity of reflection light reflected from the subject per unit amount of emission through simple averaging to obtain an emission amount which results in a reflection light intensity that may provide an optimum exposure, which is used as the provisional adequate value Cf1.

The second calculation means 42 repeats the steps 212 to 216 until the counter value i corresponds to the number of detected faces N (S217). In the example illustrated in FIG. 4B, three faces are detected, so that the counter is incremented (S218), and the steps 212 to 216 are repeated for the region 46b and block group 47b, and the region 46c and block group 47c. When the processing described above is completed for N regions (S217), the provisional adequate values Cf1 to CfN obtained in the step S216 are outputted from the second calculation means 42 (S219). In the example illustrated in FIG. 4B, three provisional adequate values Cf1 to Cf3 are outputted.

The emission amount determination means 44 determines an adequate emission amount Ch of the flash 11 by performing an adjustment using the provisional adequate value Cn outputted from the first calculation means 41 and provisional adequate values Cf1 to CfN outputted from the second calculation means 42 as reference values. In the present embodiment, adjustment of the emission amount is performed based on the parameter α stored in the parameter storage means 43. More specifically, the emission amount determination means determines the adequate emission amount Ch by performing calculations based on the Formulae (1) and (2) shown below.

$$\text{Adequate Emission Amount } Ch = Cn \times (1-\alpha) + Cf \times \alpha \quad (1)$$

$$Cf = \text{minimum}(Cf1, Cf2, \text{-- --} CfN) \quad (2)$$

That is, among the provisional adequate values obtained for a plurality of faces, a smallest value is selected (Formula (2)), and the adequate emission amount Ch is obtained by performing an adjustment using the value Cf (Cfmin) and the provisional adequate value Cn as the reference values (Formula (1)). The reason for using the smallest provisional value as the reference value is that the face with the smallest provisional adequate value is the face that reflected back the flash most strongly and is most likely to have halation. Thus, adjustment of the emission amount such that the halation would not occur on that face may prevent halation for all of the faces. For example, in the example illustrated in FIG. 4B, the provisional adequate value Cf1 of the emission amount obtained for the largest face becomes minimum, resulting in Cf=Cf1.

According to the process illustrated in FIG. 6B, N provisional adequate values Cf1 to CEN are used as reference values, and the emission amount is determined at a value within a range which would seem adequate, i.e., at a value which would seem adequate for all of the faces, based on the reference values. Thus, even in a case where a plurality of faces is detected and each face has different size and brightness (complexion), imaging with adequate flash emission may be performed, thereby an image without halation may be obtained.

When a plurality of faces is detected, the value of the parameter α is set for each of the faces, and one of the values is adopted as the value used for the calculation. More specifically, the value set for the face corresponding to the provisional adequate value selected in Formula (2) is selected as the value used in Formula (1). In the example illustrated in FIG. 4B, three parameters α1, α2 and α3 corresponding to the regions 46a, 46b, and 46c respectively are stored in the parameter storage means 43, and the parameter α1 is adopted as the parameter α in the calculation based on Formula (1).

Setting of Parameter α

In the calculation based on Formula (1), the value of Cf has greater influence in determining the adequate value Ch as the parameter α becomes greater.

Figure 7:
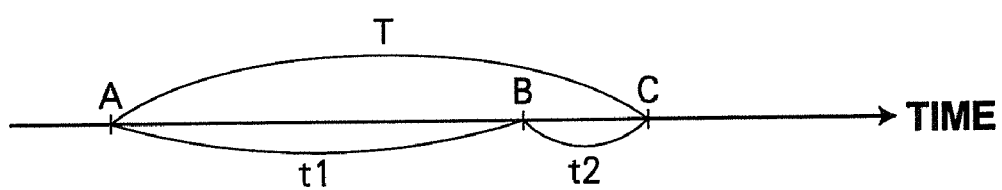
FIG. 7 illustrates a time lag.

The flash adjustment with face consideration is based on the assumption that image data used for face detection and image data used for flash adjustment are the same. In actual imaging, however, there is a time lag t1 between a time point A when image data for face detection are obtained and a time point B when non-flash emission image data are obtained, as illustrated in the time chart of FIG. 7. Further there is a time lag t2 between the time point B when non-flash emission image data are obtained and a time point C when preliminary flash emission image data are obtained. In general, the total time lag T amounts to several tens of milliseconds. Movement of subject or camera shake may occur during this time period, thereby image data for face detection and image data for flash adjustment may differ with each other.

If the image data for face detection and image data for flash adjustment differ with each other, the provisional adequate value Cf outputted from the second calculation means does not necessarily become an adequate value. The greater the difference between the two types of image data (face displacement), the less reliable will be the provisional adequate value Cf. Consequently, when the face displacement (predictable displacement) between two types of image data is great, the parameter α is set to a small value to reduce the effect of face detection result on the emission amount control. More specifically, the parameter α is set according to the following example strategies, configurations, and procedures.

The digital camera according to the present embodiment includes a plurality of parameter setting means, each for each of the example strategies. More specifically, the overall control unit 30, face region extraction unit 24, camera shake detection unit 35, and focal length control unit (not shown) act as the parameter setting means as well as carrying out their own functions. Under this configuration, the parameter α is set or updated in the parameter storage means 43 by one of the parameter setting mean selected by the user or selected based on the setting, or gradually by a plurality of selected parameter setting means.

The parameter setting function of the overall control unit 30 will be described first. Generally, the probability that the image data for flash adjustment differ from the image data for face detection becomes great as the time lag T or time lag t1 illustrated in FIG. 7 becomes great. That is, the greater the time lag, the less reliable will be the provisional adequate value Cf. Consequently, the overall control unit 30 as a parameter setting means obtains the time lag information as index data representing an influence of movement of the digital camera or the subject on the determination of emission amount. Then, if the time lag is great, the parameter α is set to a small value so that the provisional adequate value Cf does not influence greatly on the determination of the adequate value Ch.

The overall control unit 30 obtains the time lag information by measuring the actual time with the software timer using the clock function of the CPU 31. Alternatively, a dedicated timer circuit may be provided, instead of the software timer. The overall control unit 30 resets the timer when image data for face detection are supplied to the face region extraction unit 24 from the image input control unit 23, and records the timer value when image data for flash adjustment are supplied to the flash control unit 19 as the time lag. As for the image data for flash adjustment, non-flash emission image data and preliminary flash emission image data are available, but only a timer value when either one of them is supplied is required to be recorded.

Figure 8:
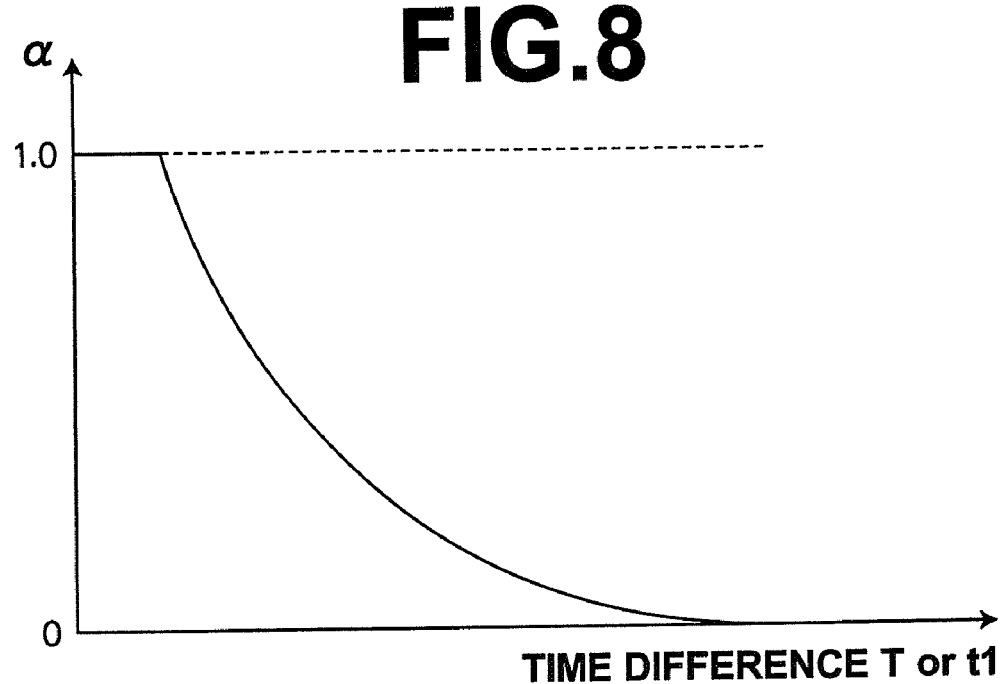
FIG. 8 illustrates an example LUT used in determining a parameter α.

The RAM 32 of the overall control unit 30 includes a look up table (LUT) that defines correspondence between time lag and parameter α. FIG. 8 illustrates an example LUT. Preferably, the LUT is defined such that the greater the time lag the smaller the value of the parameter α. The LUT, however, may be a table like that illustrated in FIG. 8 in which the value of the parameter α start decreasing monotonically when the time lag exceeds a predetermined value. That is, the value of the parameter α may be constant in a certain range if it is decreasing monotonically with respect to the time lag in the other range. The overall control unit 30 obtains a parameter value corresponding to the time lag measured by the timer by referring to the LUT. The obtained value is sent to the flash control unit 19 and stored in the parameter storage means.

The timer and LUT may be provided in the flash control unit 19. In this case, the flash control unit 19 resets the timer when a face detection result is supplied thereto from the face region extraction unit 24, and records the timer value as the time lag when non-flash image data or preliminary flash emission image data are supplied thereto. Although there is a slight time lag between a time point when the image data for face detection are generated and a time point when the face detection result is obtained, the time lag obtained by the measurement with its base point at the time point when the face detection result is obtained is still effective as the index data. Further, by activating the timer only when face detection result shows that region information is included, that is, only when a face is detected, unnecessary time measurement is not performed. Thus, the load of the digital camera may be reduced compared to the case in which time measurement is performed with its base point at a time point when image data for face detection are supplied.

As described above, if time lag is measure, and the parameter α is set to the value according to the time lag, the importance of face in the emission amount control may be adjusted, so that the emission amount may be controlled to an adequate value.

The parameter setting method considering time lag may include a method in which the parameter value is determined based on the status of the camera or imaging mode being set, other than the method described above. The magnitude of time lag depends on the status of the camera or imaging mode. Therefore, the status of the camera or imaging mode is effective as the index data representing an influence of movement of the digital camera or subject on the determination of emission amount. Setting of the parameter α to a small value when the digital camera is in a status or in an imaging mode in which the time lag is likely to become great may provide an identical effect to the case where the parameter value is adjusted according to the measured time lag. The referent of "status of the camera" as used herein means the status distinguishable inside of the digital camera. For example, statuses before and after a predetermined manipulation is performed can be said different. Further the statuses before and after a predetermined operation or process is performed can be said different.

Figure 9:
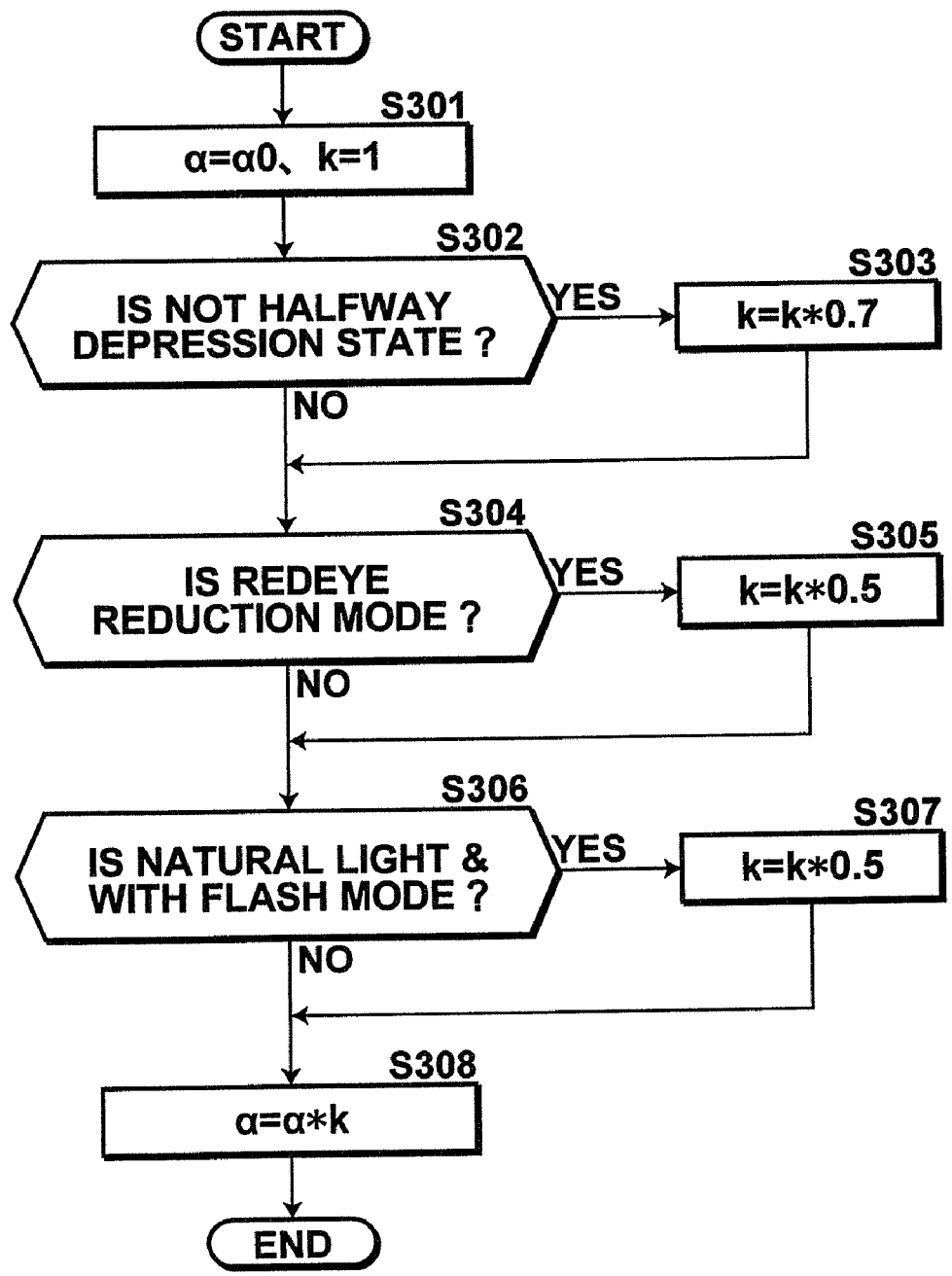
FIG. 9 is a flowchart illustrating an example process for setting the parameter based on the imaging mode and the status of the digital camera.

FIG. 9 illustrates an example process for setting the parameter α based on the status of the camera and imaging mode. The overall control unit 30 initializes the value of the parameter α to a value α0, and the value of a variable k to 1 (S301). If the processing unit acting as the parameter setting means is only the overall control unit 30, the value α0 is 1. If a processing unit other than the overall control unit involves the parameter setting, the value of α0 is set to a value by reading out the value from the parameter storage means 43, which has been set by the other processing unit.

After the initialization, the overall control unit 30 makes adjustment to the parameter α based on the status of the camera. In the example illustrated in drawing, as the status of the camera, a determination is made as to whether a halfway depression status of the shutter release button 2, i.e., a status of the shutter release button being lightly depressed and stopped there, exists (S302). If the halfway depression state is not detected, the variable k is multiplied by a coefficient of 0.7 (S303). If the halfway depression state is detected, the process proceeds to the next step without changing the value of the variable k.

Figure 10A:
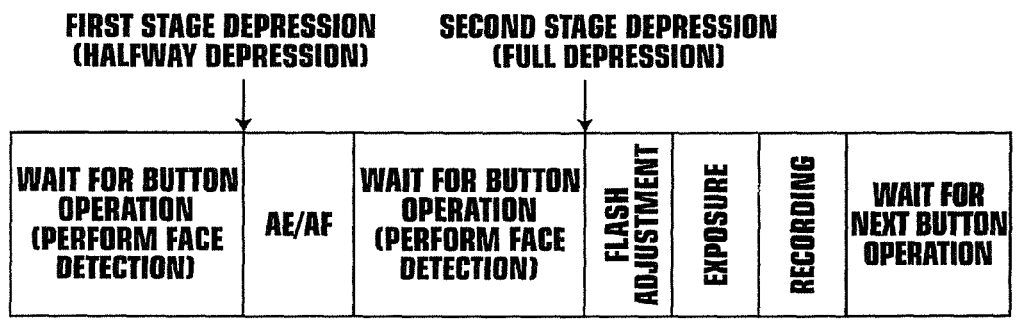
FIG. 10A illustrates the relationship between the status of the digital camera and time lag.
Figure 10B:
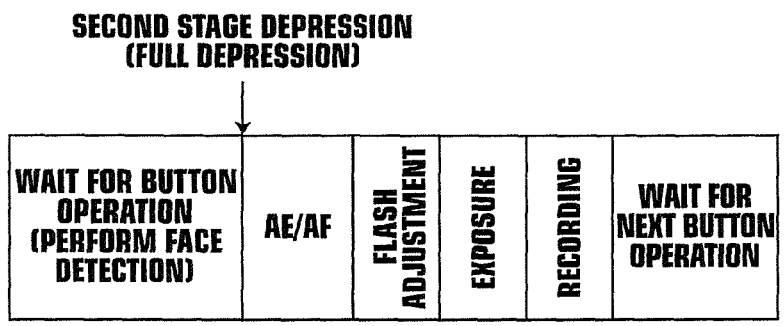
FIG. 10B illustrates the relationship between the status of the digital camera and time lag.
Figure 10C:
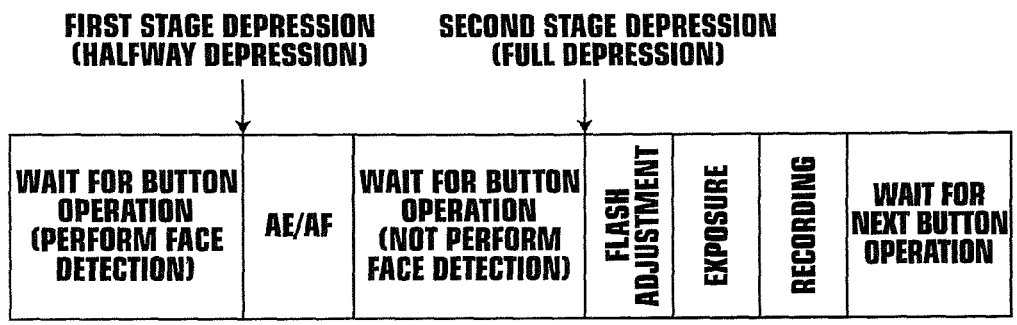
FIG. 10C illustrates the relationship between the status of the digital camera and time lag.

The reason why the halfway depression state is determined will now be described. FIGS. 10A to 10C illustrate the relationship between the operation of the shutter release button and the operation of the digital camera by arranging the processes of the digital camera from left to right of the drawings with time. FIGS. 10A and 10C illustrate the operation of the digital camera 1 when the shutter release button 2 is depressed to a first stage (halfway depression), then after a while, it is depressed to a second stage (full depression). On the other hand, FIG. 10B illustrates the operation of the digital camera 1 when the shutter release button 2 is depressed to the second stage without stopping.

As illustrated in FIG. 10A, the digital camera 1 according to the present embodiment performs face detection before the shutter release button 2 is operated. When a halfway depression of the shutter release button 2 is detected, it continues the face detection until a full depression of the shutter release button 2 is detected. The flash emission amount is calculated in the flash adjustment process performed after the full depression is detected. In the calculation of the emission amount, a face detection result immediately preceding the flash adjustment is used.

In the mean time, as illustrated in FIG. 10B, when the shutter release button 2 is depressed to the second stage without stopping, the face detection is performed only before the shutter release button 2 is depressed. Further, the AE/AF process is performed after the shutter release button 2 is depressed, so that the time lag T (or t1) becomes greater compared to the case in which the shutter release button 2 is fully depressed by way of halfway depression. That is, determination as to whether the shutter release button has gone through a halfway depression phase made in the step S302 is substantially identical to the determination as to whether the time lag is great.

It is noted that there is a digital camera which is different in type from the digital camera 1, in which the face detection is not performed after the shutter release button is depressed, as illustrated in FIG. 10C. In the case of the digital camera that operates in the manner as illustrated in FIG. 10C, the time lag becomes greater when the shutter release button has gone through a halfway depression phase, as apparent from the comparison of FIG. 10C with FIG. 10B. Consequently, for the type of digital camera illustrated in FIG. 10C, it preferable that the variable k is multiplied by a coefficient less than 1, which is contrary to the example process illustrated in FIG. 9.

As evident from the examples illustrated in FIGS. 10A and 10C, when making adjustment to the parameter α based on the camera status, the desirable adjustment method differs according to the specifications and performance of the camera. Preferably, the degree of increase or decrease of the parameter, i.e., the value of coefficient by which the variable k is multiplied is also determined according to the specifications and performance of the camera. It will be obvious to those skilled in the art that the variable k may be adjusted by discriminating other statuses in which the time lag is likely to become great.

When the adjustment of the variable k is completed, the overall control unit 30 determines whether a predetermined imaging mode is set by referring to the EEPROM 33. In the example illustrated in FIG. 9, the overall control unit 30 determines whether Redeye Reduction mode or Natural Light & With Flash mode is set, which are the modes in which a time lag of 0.5 is certainly occurs (S304, S306). If Redeye Reduction mode is set, the overall control unit 30 multiplies the variable k by a coefficient of 0.5 (S305). In Redeye Reduction mode, a flash is emitted for contracting the pupils of the subject after operation of the shutter release button 2 is detected, and a time to contract the pupils is provided, so that the time lag becomes great. Therefore, the parameter α is set to a small value by the steps S304 and S305.

Further, the overall control unit 30 multiplies the variable k by a coefficient of 0.5 when Natural Light & With Flash mode is set (S307). Natural Light & With Flash mode is a mode in which non-flash imaging and flash imaging are performed automatically by a single depression of the shutter release button. For this reason, the time lag T becomes greater compared to other imaging mode by the time required for non-flash imaging. Therefore, the parameter α is set to a small value by the steps S306 and S307.

In addition to the aforementioned imaging modes, if there is any other imaging mode in which the time lag T becomes inevitably great in order to achieve the purpose of the mode, or likely to become great, it is preferable that the parameter α be set to a small value in the same manner as described above.

In the process illustrated in FIG. 9, the variable k is multiplied by a coefficient step by step in steps S303, S305, and S307. For example, with Redeye Reduction mode is being selected, if the shutter button is fully depressed directly, the value of the variable k becomes 0.35.

In the step S308, the initial value α0 of the parameter α is multiplied by the variable k determined through the steps S301 to S307. The value of the parameter α determined by this is sent to the flash control unit 19 and stored in the parameter storage means.

As describe above, adjustment of the parameter based on the camera status and imaging mode allows emission amount control considering the reliability of face detection result to be achieved through comparatively simple processing.

When a process for correcting camera shake is performed by the digital camera on image data to be used for face detection or flash adjustment, the reliability of the face detection result is not necessarily degraded even if the time lag described above is great. Thus, an arrangement may be adopted in which on/off status of Stabilization (Anti-Shake) mode is discriminated by the overall control unit 30, and the process illustrated in FIG. 9 is performed only when Stabilization mode is in off state.

Figure 11:
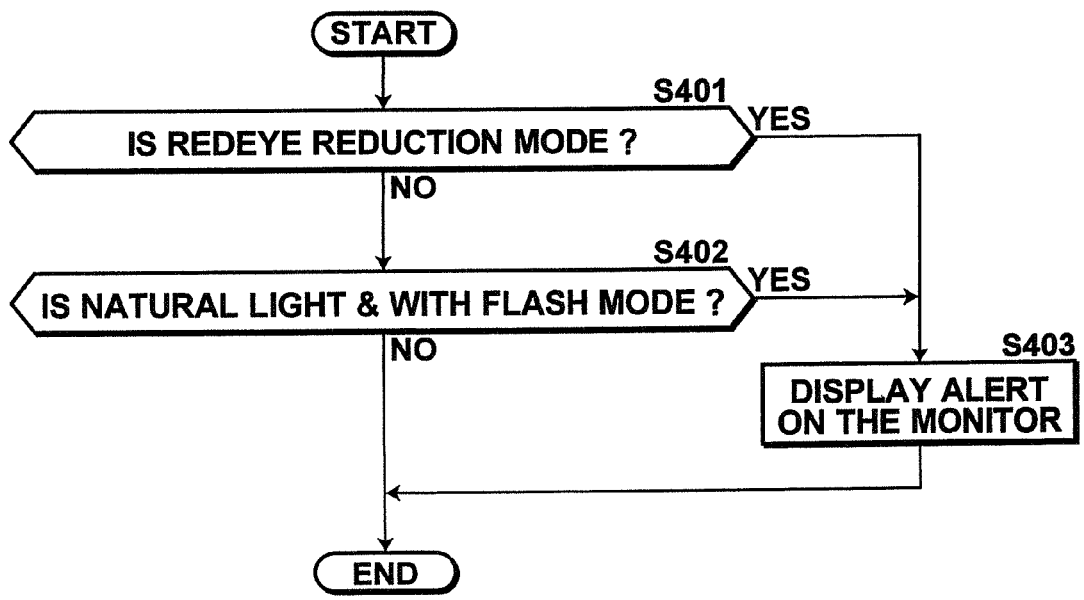
FIG. 11 illustrates an example alert process.

Here, the discrimination of the imaging mode may be made before the shutter release button 2 is depressed. Therefore, the overall control unit 30 may discriminate the imaging mode regardless of the operation of the shutter release button 2, and provide a predetermined alert if the time lag is expected to exceed a predetermined time. FIG. 11 illustrates an example process of the overall control unit for providing an alert. In the example illustrated in FIG. 11, the overall control unit 30 determines whether Redeye Reduction mode is set by referring to the EEPROM 33 (S401). Further, it also determines whether Natural Light & With Flash mode is set (S402). If either one of the modes or both are set, an alert mark or message indicating that the face is not emphasized in the flash emission amount control is displayed on the liquid crystal display 27 through the display control unit 26 (S403). Alternatively, instead of outputting to the liquid crystal display 27, a LED lamp provided on the digital camera may be blinked or the speaker may be beeped.

The alerting of the overall control unit 30 allows the user to have an opportunity to change the imaging mode. The user may set the mode causing the alert to off, if the user wants to put priority on the flash emission amount control emphasizing the face, and then may perform imaging.

The discrimination of the imaging mode may also be made based on notification of mode switching from another processing unit, other than the information obtained from the EEPROM 33. For example, in the case where a plurality of face detection processes, each having different detection accuracy, is selectively performed by the face region extraction unit 24, a face detection process having high detection accuracy requires a longer time so that the time lag T is likely to become great. Thus, an arrangement may be adopted in which switching over of the face detection processes is notified to the overall control unit 30 from the face region extraction unit 24 as a type of mode change. This allows the overall control unit 30 to cause the digital camera 1 to perform alerting operation when a face detection process requiring a long processing time is selected.

The alerting operation may be performed after the shutter release button 2 is depressed. When the time lag is measured by the timer, the time lag may not be estimated in advance. Therefore, after the imaging operation is completed, a determination is made as to whether an alerting operation is required based on a determination as to whether the time lag exceeded a predetermined time, and an alerting operation is performed if required. Further, in the case where a determination is made as to whether an alerting operation is required based on the imaging mode, the example process illustrated in FIG. 11 may be performed after the imaging is completed. For example, when an image is displayed on the monitor immediately after the imaging for verification by the user, an alert mark or the like is displayed on the monitor with the image. This allows the user to understand the cause of poor quality of the obtained image, and to perform imaging again after changing the imaging conditions.

Next, the parameter setting function of the face region extraction unit 24 will be described. FIGS. 12A, 12B, 13A, and 13B illustrate the relationship among image data, area indicated by region information, and regional block group selected in the step S201 in FIG. 6A, or in the step S212 in FIG. 6B. The image data 48 are those used by the face region extraction unit 24 for face detection, and image data 45 are those (non-flash emission image data or preliminary flash emission image data) used by the flash control unit 19 for flash adjustment. The ellipses 49 in FIGS. 12B and 13B indicate face positions at the time of flash adjustment.

Figure 12A:
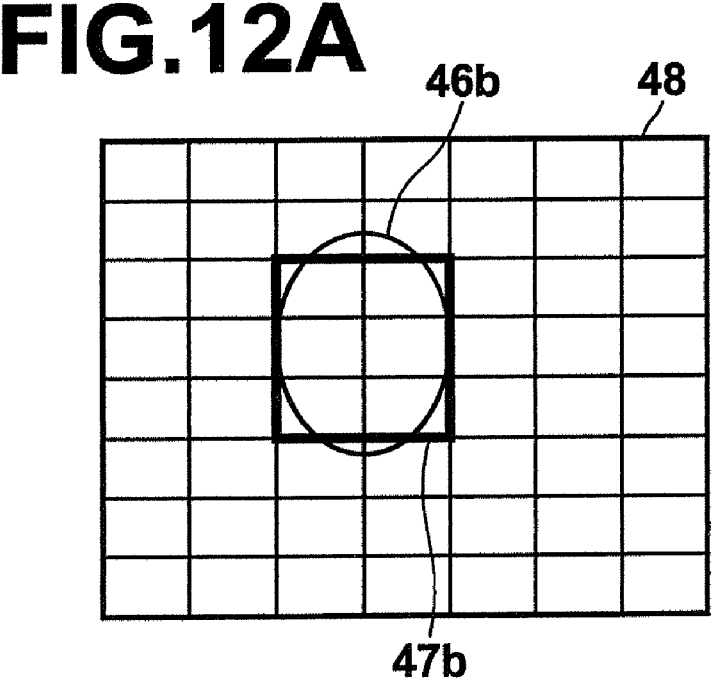
FIG. 12A illustrates relationship among image data, face portion, and regional blocks (large face ratio, at the time of face detection).
Figure 12B:
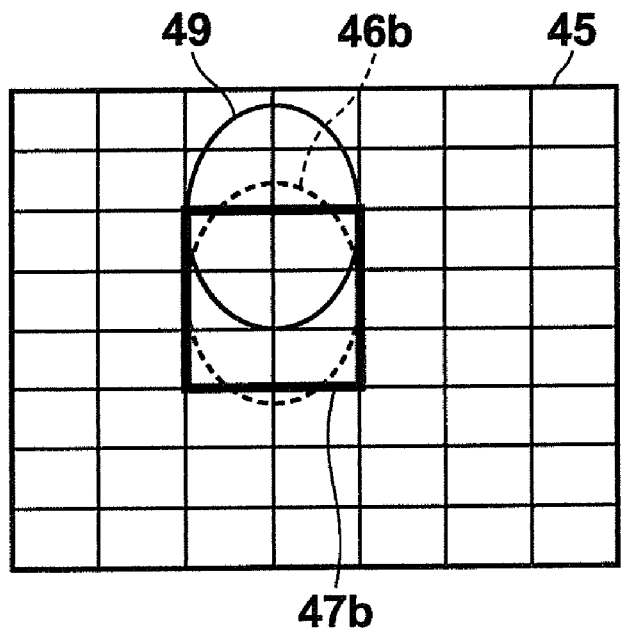
FIG. 12B illustrates relationship among image data, face portion, and regional blocks (large face ratio, at the time of flash adjustment).
Figure 13A:
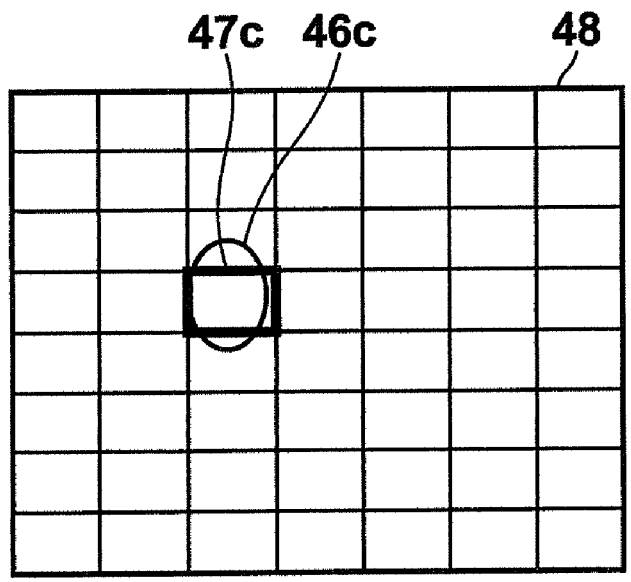
FIG. 13A illustrates relationship among image data, face portion, and regional blocks (small face ratio, at the time of face detection).
Figure 13B:
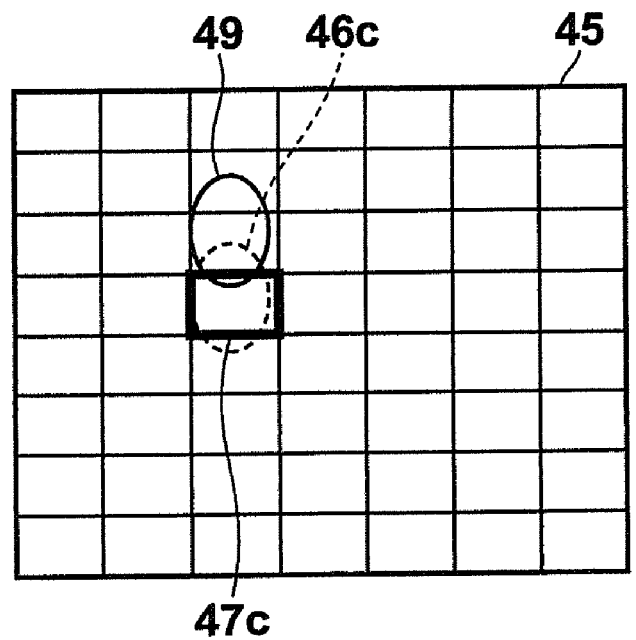
FIG. 13B illustrates relationship among image data, face portion, and regional blocks (small face ratio, at the time of flash adjustment).

As illustrated in FIGS. 12a and 12B, even if the face position moves slightly from the region 46b, most of the blocks in the selected regional block group 47b correspond to the displaced face (ellipse 49) when the proportion of the face in the image is relatively great. Thus, even if such displacement occurs, the luminance information of the selected regional block group 47b is still usable as the reference for flash adjustment. But, in a case where the proportion of the face in the image is small and only a single block corresponds to the face, as illustrated in FIGS. 13A and 13B, the block 47c does not corresponds to the face due to a movement of the face position from the region 46c to another place. In this case, the luminance information of the block 47c is no longer usable as the reference for flash adjustment with face consideration. This means that the reliability of the provisional adequate value Cf or Cfi increases as the proportion of the face in the image increases, and decreases as the proportion of the face in the image decreases.

Consequently, in the present embodiment, after the face detection is completed, the face region extraction unit 24 calculates the ratio of the extracted region to the horizontal width with respect to each detected image. That is, it obtains data indicating the ratio of the face to the entire image as the index data representing an influence of movement of the digital camera or subject on the determination of emission amount. Thereafter, the face region extraction unit 24 determines the value of the parameter α for each detected face by referring to a lookup table (LUT) that defines correspondence between the calculated ratio and the value of the parameter α, and stores the corresponding α value in the parameter storage means 43 of the flash control unit 19. If N faces are detected, the face region extraction unit 24 determines N parameter values α1 to αN and stores in the parameter storage means 43. In the example illustrated in FIG. 4B, three parameters α1 to α3 are stored in the parameter storage means 43. It will be obvious to those skilled in the art that an electric circuit or program for performing the identical conversion to the LUT may be employed, instead of using the LUT.

Figure 14:
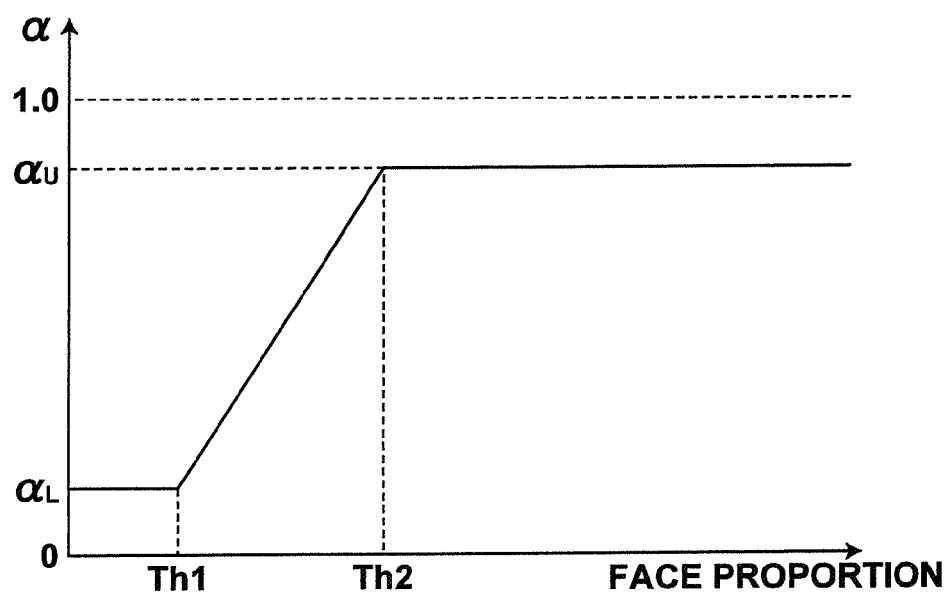
FIG. 14 illustrates an example LUT used for determining parameter α.

FIG. 14 illustrates an example LUT. According to the LUT illustrated in FIG. 9, if the face proportion is smaller than a predetermined threshold value Th1, the parameter α is set to a predetermined lower limit value αL, which is not zero. If the face proportion is greater than a predetermined threshold value Th2, the parameter α is set to a predetermined upper limit value αU, which is not one. If the face proportion is in the range from the threshold value Th1 and threshold value Th2, the parameter α is set such that the greater the face proportion, the greater the value within the range from the lower limit value αL to the upper limit value αU. This causes the influence of the provisional adequate value Cf in the adjustment of emission amount to be increased when the reliability of the provisional adequate value Cf is high, and the influence of the provisional adequate value Cf in the adjustment of emission amount to be decreased if the reliability of the provisional adequate value Cf is low.

In the present embodiment, the ratio of the face to the image in the horizontal width is calculated, but any value may be calculated as long as it serves as an index of face proportion in the image. For example, the area of the extracted region, the number of pixels in the extracted region, or area ratio of the face to the entire area of the image may be calculated. Alternatively, since the horizontal width of a face and the distance between the eyes of the face are correlated with each other, so that eyes are detected to obtain the distance between the eyes, and the obtained distance may be used in the calculation as an index value indicating a face proportion in an image. That is, the parameter set as the horizontal axis of the LUT, any parameter may be used as long as it meets the purpose of the processing described above. Further, in the LUT described above, the value of the parameter increases linearly in the range from the threshold value Th1 to the threshold value Th2, but a non-linear curve may also be employed for this purpose. Further, the threshold values Th1 and Th2 may be determined arbitrarily according to the design principle. Thus, an LUT in which the value of α increases monotonically over the entire range without providing any threshold value may be employed, other than that described above in which the value of α increases monotonically only within a portion of the entire range delimited by the threshold values.

Figure 15:
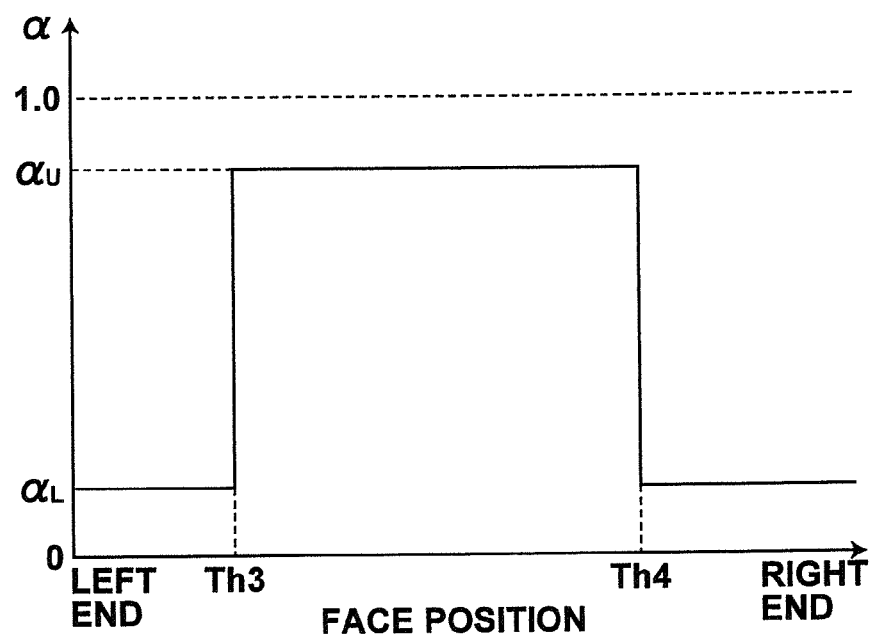
FIG. 15 illustrates another example LUT used for determining parameter α.

Various other principles for determining the parameter α, and LUTs for use in determination of the parameter are conceivable. For example, if a person's face is detected in a peripheral portion of an image, it is not likely that the person is an imaging subject. Therefore, in the LUT illustrated in FIG. 15, if the position where a face is detected is within the range from Th3 to Th4 in terms of the distance from the left edge of an image, the parameter α is set to the upper limit value αU, and if the position where a face is detected is other than in the range, i.e., in a peripheral portion of the image, the parameter α is set to the lower limit value al., The use of the aforementioned LUT in setting the parameter α may increase the influence of the provisional adequate value Cf in the adjustment of emission amount when the detected face is a main subject, while if the detected face is a face included in the image in contrary to the intention of the photographer, the influence of the provisional adequate value Cf in the adjustment of emission amount may be reduced.

Figure 16:
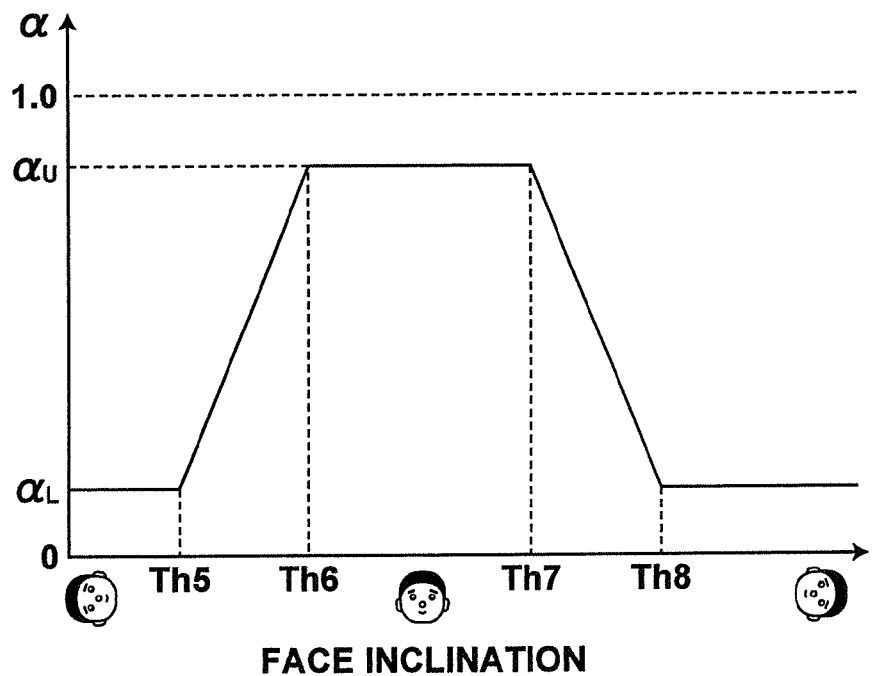
FIG. 16 illustrates still another example LUT used for determining parameter α.

Further, another method, in which the value of the parameter a is determined according to the inclination of the detected face (inclination degree of the neck), or orientation of the detected face (front or side face), may also be conceivable. Although it may depend on how the face region extraction unit 24 has learned for face detection, the probability of erroneous face detection is generally higher for inclined faces or side faces than for upright front faces. That is, the reliability of the provisional adequate value Cf outputted from the second calculation means is higher for faces with inclination closer to vertical or orientation closer to the front. Consequently, such a LUT as illustrated in FIG. 16 may be defined, in which the horizontal axis represents the face inclination, and the parameter α is set to the upper limit value αU when the inclination of a face is vertical or near vertical, to a smaller value for greater inclination in the range from a predetermined threshold value Th5 to a predetermined threshold value Th6, and in the range from a predetermined threshold value 7 to a predetermined threshold value 8, and set to the lower limit value αL if the inclination exceeds the threshold value Th5 or Th8 and becomes horizontal or near horizontal. Alternatively, a similar LUT with the horizontal axis representing the face orientation may be defined. This causes the influence of the provisional adequate value Cf in the adjustment of emission amount to be increased when the reliability of the provisional adequate value Cf is high, and the influence of the provisional adequate value Cf in the adjustment of emission amount to be decreased if the reliability of the provisional adequate value Cf is low.

When the ratio of the face to the entire image falls below a predetermined reference, and a face is detected in a peripheral portion of an image, a side face is detected, or the like, the face region extraction unit 24 sends an alert signal to the overall control unit 30. The overall control unit 30 receiving the alert signal performs the alerting operation described above.

Next, the parameter setting function of the camera shake detection unit 35 will be described.

Detection of a camera shake implies the occurrence of the situation as illustrated in FIG. 12B or 13B, and the reliability of the provisional adequate value Cf decreases as the amount of shake increases. That is, the amount of shake itself detected by the camera shake detection unit 35 may become the index data representing an influence of movement of the digital camera or subject on the determination of emission amount.

Figure 17:
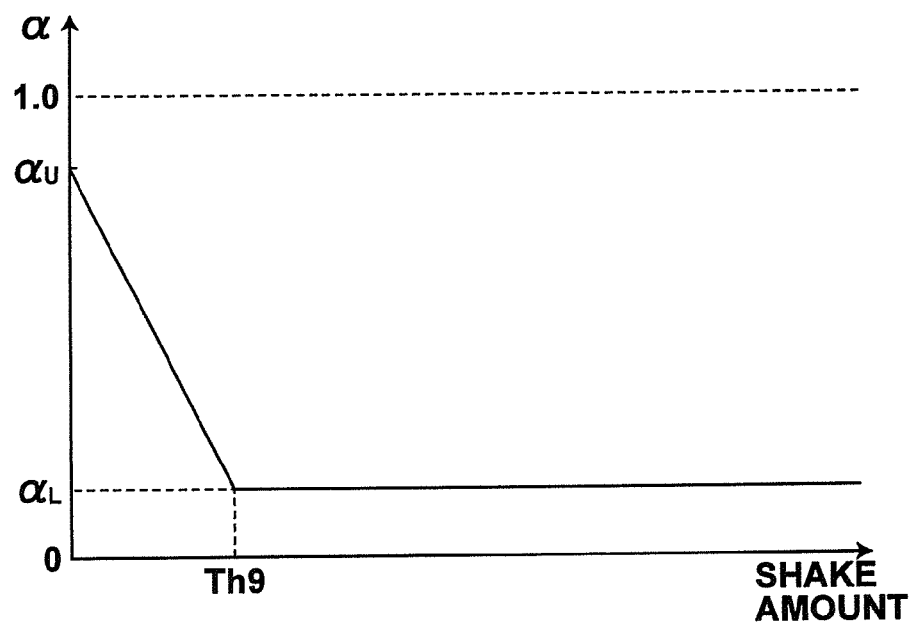
FIG. 17 illustrates a further example LUT used for determining parameter α.

The camera shake detection unit 35 also uses a LUT for determining the value of the parameter α. FIG. 17 illustrates an example LUT used by the camera shake detection unit 35. The camera shake detection unit 35 not only detects the occurrence of a camera shake but also measures the amount of shake, so that the horizontal axis of the LUT represents shake amount. According to this LUT, when the amount of shake is zero, the parameter α is set to the upper limit value αU, thereafter to a smaller value for a greater shake amount, and to the lower limit value αL when the shake amount exceeds a predetermined threshold value Th9. This causes the influence of the provisional adequate value Cf in the adjustment of emission amount to be increased when the reliability of the provisional adequate value Cf is high, and the influence of the provisional adequate value Cf in the adjustment of emission amount to be decreased if the reliability of the provisional adequate value Cf is low.

Further, when the amount of detected shake exceeds a predetermined reference, the camera shake detection unit 35 sends an alert signal to the overall control unit 30. The overall control unit 30 receiving the alert signal performs the alerting operation described above.

Still further, another processing unit may be used as a parameter setting means. In photography using a lens with a long focal length, such as a telephoto lens, the influence of a camera shake becomes more apparent in comparison with ordinary photography, since the field angle is smaller. This means that the reliability of the provisional adequate value Cf is not high when the focal length is long. Consequently, the parameter value according to the focal length may be set by the overall control unit 30, which is capable of detecting a lens exchange operation, or by a focal length control unit (not shown) that performs zoom control by obtaining focal length information as the index data. As for the LUT for this purpose, for example, a table that sets the parameter α to the lower limit value αL when the focal length is longer than a predetermined threshold value. This causes the influence of the provisional adequate value Cf in the adjustment of emission amount is decreased when the focal length is long and susceptible to a camera shake, so that the emission amount obtained by the calculation does not depart largely from an appropriate range even if a movement of the subject or camera shake occurs.

Further, the distance to the subject may be used as the index data representing an influence of movement of the digital camera or subject on the determination of emission amount. The distance to the subject is measured by the distance measurement function described above. There is a correlation between the distance to the subject (face) from the digital camera and the face size (face proportion in an image). Therefore, the parameter setting according to the distance to the subject may results in the same effects as the parameter setting according to the face proportion in an image.

Note that in the case where the parameter $\alpha$ is set according to the face position or other elements, the LUTs are not limited to those illustrated in the Figures. A LUT in which the parameter increases/decreases non-linearly instead of linearly may be employed. Further, whether or not a threshold is provided, and the value of the threshold may be determined arbitrarily according to the design principle.

The processing unit that performs the parameter setting and the LUT to be used may be switched according to the settings of the digital camera, including imaging mode. Instead of the parameter storage means 43 that simply stores the parameter, a means for accepting input of parameter values or index data from a plurality of processing units, and obtaining a new optimum parameter value using the inputted plurality of values may be provided.

For example, parameter values outputted from the face region extraction unit 24, camera shake detection unit 35, and other processing units are used as the initial value $\alpha 0$ in the process illustrated in FIG. 9, and a parameter value is obtained through the example process illustrated in FIG. 9. Alternatively, index data outputted by each processing unit may be collected, and the parameter value may be determined based on the combination of a plurality of index data.

In the present embodiment, processing units involving the parameter setting send information related to the parameter setting to the record/readout control unit 28. The information includes the index data. For example, data, such as a measured time lag T (millisecond), face emphasis rate (%), existence or nonexistence of alert, calculated adequate emission amount (Av), and the like are sent to the record/readout control unit 28 from the respective units determining the respective values. When recording an Exif file to the memory card 29, the record/readout control unit 28 stores these data in a predetermined region of the file header. Alternatively, the information related to the parameter setting may be included in debug data tagged to the Exif file.

When an instruction to display an obtained image for verification is given from the user, the overall control unit 30 and display control unit 26 display the information related to the parameter setting, as well as the image. This allows the user to understand the relationship between the imaged conditions and face consideration level.

Limitation of Adequate Emission Amount Range

The digital camera according to the embodiment described above may reduce the influence of the provisional adequate value Cf in the adjustment of the emission amount when a problem is detected or predicted in performing flash adjustment using a face detection result. In actual photography, however, a problem that may not be detected or predicted in advance (e.g., erroneous face detection) may occur. In order to keep the emission amount determined by the emission amount determination means 44 not to depart largely from the adequate value even when an unpredictable problem occurs, it is preferable to limit the emission amount within a predetermined range. Hereinafter, the configuration and processing for this purpose will be described.

Firstly, a method that obtains upper and lower limit values based on an adequate value obtained when flash adjustment is performed without face consideration is conceivable as one of the methods. This method is effective when erroneous face detection has occurred.

In this case, the emission amount determination means 44 refers to the adequate value obtained through flash adjustment without face consideration, that is, the provisional adequate value Cn outputted from the first calculation means 41, and limits the adequate emission amount Ch in a range which would be regarded appropriate judging from the provisional adequate value Cn.

More specifically, the emission amount determination means 44 determines the adequate emission amount Ch based on Formulae (3) and (4) shown below.

$$Ck = Cn \times (1-\alpha) + Cf \times \alpha \qquad (3)$$

$$AdequateEmissionAmountCh = \begin{cases} Cn + UL \ (Ck \geq Cn + UL) \\ Ck \ (Cn - LL \leq Ck \leq Cn + UL) \\ Cn - LL \ (Ck \leq Cn - LL) \end{cases} \qquad (4)$$

where, Ck is a provisional adequate emission amount, UL is a maximum possible value of difference between the adequate value Cf and adequate value Cn in the case where face detection is performed successfully and the adequate value Cf is greater than the adequate value Cn, and LL is a maximum possible value of difference between the adequate value Cf and adequate value Cn in the case where face detection is performed successfully and the adequate value Cf is smaller than the adequate value Cn. The values of UL and LL are those obtained empirically by repeating flash adjustments for subjects including faces.

The provisional adequate emission amount Ck obtained by Formula (3) above may become an extremely large or small value when an unexpected situation occurs. But, even when the provisional adequate emission amount Ck becomes such an extreme large or small value, the adequate emission amount Ch is limited in the range from Cn−LL to Cn+UL through Formula (4) above. The lower limit value Cn−LL and the upper limit value Cn+UL are values determined based on the adequate value Cn, so that an image obtained by the flash photography will not result in a complete failure, as long as the emission amount falls within the range. That is, according to the present embodiment, the photography will not be spoiled completely, and may obtain an image which is worth viewing, though not of optimum quality, even when an unexpected situation occurs.

The above description is an example case in which the upper and lower limit values for the adequate emission amount Ch are provided. Alternatively, an arrangement may be adopted in which only an upper or lower limit value is provided, and the adequate emission amount Ch is limited only when the value thereof becomes an extremely large or small.

As another method, a method that obtains the upper and lower limit values based on an adequate flash emission amount when flash adjustment is performed in consideration of the subject located near the center. This method is effective when a face which is not the target has inadvertently included in the imaging scope.

Figure 18:
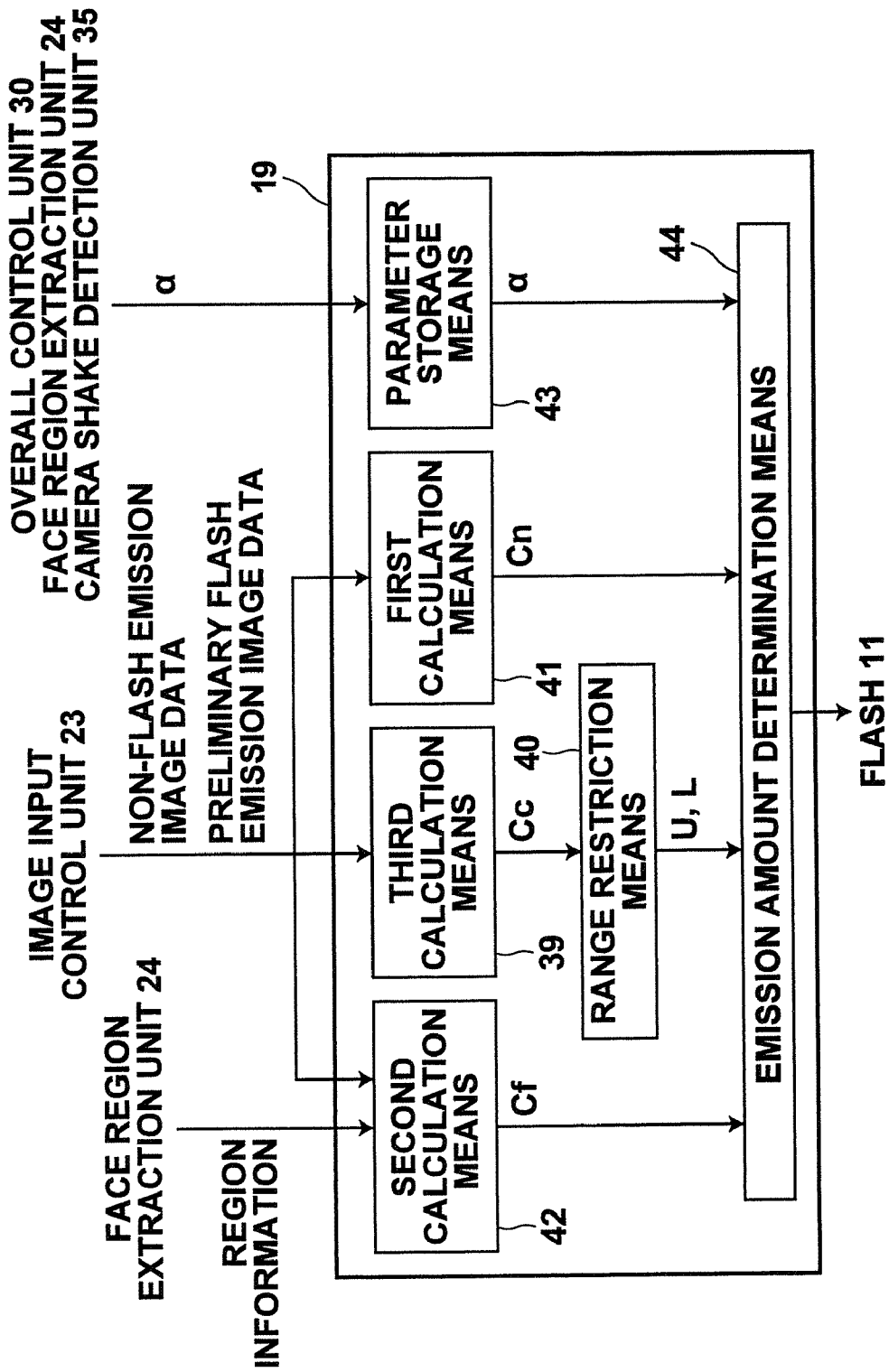
FIG. 18 illustrates another example structure of the flash control unit and input/output data thereof.

FIG. 18 illustrates another example structure of the flash control unit 19 that includes a third calculation means 39 and a range restriction means 40. Processes performed by the other means included in FIG. 18 are identical to those described with reference to FIG. 3, so that they will not be elaborated upon further here.

The third calculation means 39 receives non-flash emission image data and preliminary flash emission image data from the image input control unit 23 under control of the overall control unit 30, as in the first calculation means 41. The third calculation means 39 obtains and outputs a provisional adequate value Cc for flash emission amount when flash adjustment is performed in consideration of a subject located near the center of an image by performing an arithmetic operation to be described later using these two types of images.

Figure 19:
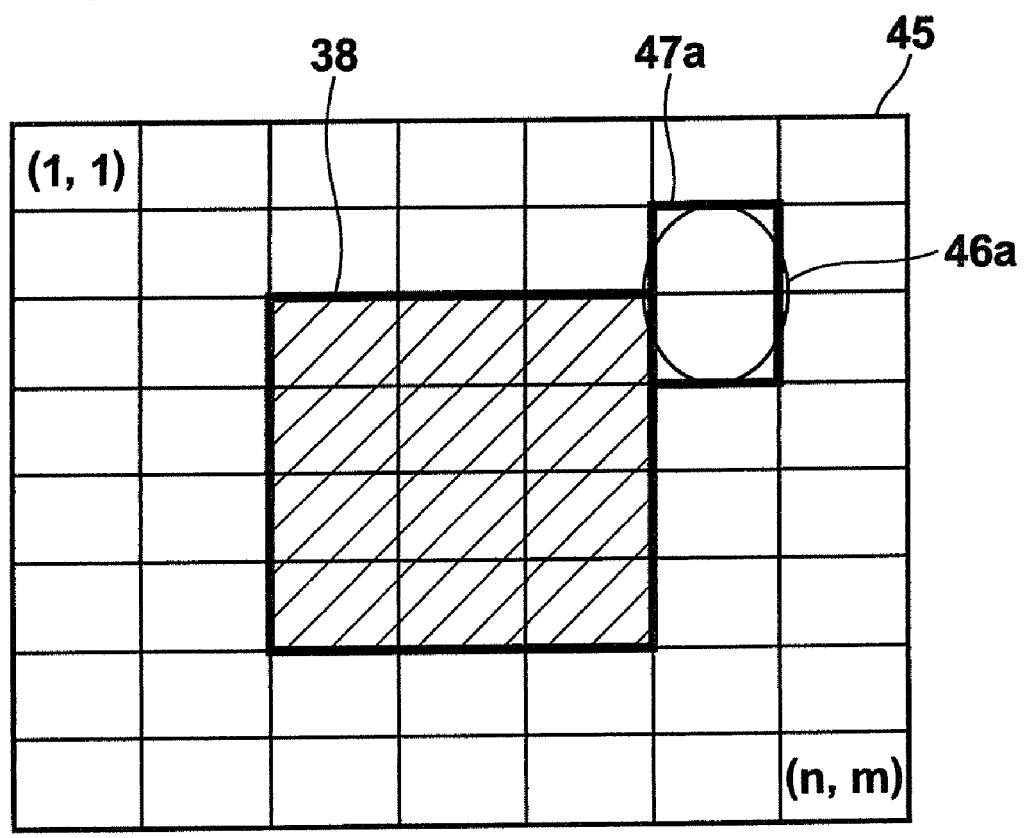
FIG. 19 illustrates image data divided into regional blocks, and a group of blocks near the center is defined.

FIG. 19 illustrates an example division of image data into regional blocks, in which image data 45 (non-flash emission image data or preliminary flash emission image data) are divided into n×m regional blocks. FIG. 20 is a flowchart illustrating a process performed by the third calculation means. The third calculation means 39 obtains luminance information Ya (u, v) from the regional block of non-flash emission image data located near the center thereof (S501). Further, it obtains luminance information Yb (u, v) from the regional block of preliminary flash emission image data located near the center thereof (S502). In the example illustrated in FIG. 19, luminance information Ya (u1, v1) to Ya (u12, v12), and Yb (u1, v1) to Yb (u12, v12) is obtained from 12 regional blocks 38 located near the center.

Then, the third calculation means 39 calculates the difference Yd (u, v) between the luminance information Yb (u, v) obtained in step S502 and luminance information Ya (u, v) obtained in step S501 for each regional block (S503). Then, the third calculation means 39 determines an adequate value for the emission amount when flash adjustment is performed in consideration of a subject located near the center (provisional adequate value Cc) based on the difference Yd (u, v) (S504). In the example illustrated in FIG. 19, differences Yd (u1, v1) to Yd (u12, v12) for the 12 regional blocks are obtained, and the provisional adequate value Cc is determined. For example, a weighted average of the differences Yd (1, 1) to Yd (n, m) is obtained after allocating a greater weight to the differences Yd (u1, v1) to Yd (u12, v12) calculated for the regional blocks located near the center. Then, the third calculation means 39 estimates an intensity of reflection light reflected from the subject per unit amount of emission based on the weighted average to obtain an emission amount which results in a reflection light intensity that may provide an optimum exposure, and outputs as the provisional adequate value Cc.

The range restriction means 40 restricts the value of the adequate emission amount Ch outputted from the emission amount determination means 44 within a predetermined range by setting upper and lower limit values on the adequate emission amount determined by the emission amount determination means 44. With reference to the adequate emission amount when flash adjustment is performed in consideration of the subject located near the center, i.e., the provisional adequate value Cc outputted from the third calculation means 39, the range restriction means 40 restricts the adequate emission amount Ch in a range which would be regarded appropriate judging from the provisional adequate value Cc. That is, the range restriction means 40 restricts the adequate emission amount Ch within a range defined by an upper limit value U (Cc) and a Lower limit value L (Cc) that vary according to the provisional adequate value Cc, as illustrated in FIG. 21.

For example, the upper limit value U (Cc) and Lower limit value L (Cc) may be determined in the following manner. A maximum possible value A which is the absolute difference between the adequate value Cc and adequate value Cn when the adequate value Cc is greater than the adequate value Cn, and a maximum possible value B which is the absolute difference between the adequate value Cc and adequate value Cn when the adequate value Cc is smaller than the adequate value Cn are empirically obtained by repeating flash adjustments for various subjects in advance. Then, the upper limit value U (Cc) is set to Cc+A, and Lower limit value L (Cc) is set to Cc−B.

The emission amount determination means 44 obtains an emission amount for the real emission using the provisional adequate value Cn outputted from the first calculation means 41, the provisional adequate value Cf outputted from the second calculation means 43, and the parameter α read out from the parameter storage means 43. At this time, if the emission amount obtained by calculation exceeds the upper limit value U (Cc) determined by the range restriction means 40, the emission amount determination means 44 determines the emission amount to the upper limit value U (Cc). If the emission amount obtained by calculation falls below the lower limit value L (Cc) determined by the range restriction means 40, the emission amount determination means 44 determines the emission amount to the lower limit value L (Cc). More specifically, the emission amount determination means 44 determines the adequate emission amount Ch based on Formulae (3) and (5) shown below.

$$Ck = Cn \times (1-\alpha) + Cf \times \alpha \qquad (3)$$

$$AdequateEmissionAmountCh = \begin{cases} U(Cc) & (Ck \geq U(Cc)) \\ Ck (L(Cc) \leq Ck \leq U(Cc)) \\ L(Cc) & (Ck \leq L(Cc)) \end{cases} \qquad (5)$$

According to the structure illustrated in FIG. 18, and arithmetic processing based on Formulae (3) and (5), a flash adjustment using detected face information is performed by the second calculation means 42. At the same time, a flash adjustment considering an object which is highly likely the intended imaging target, such as the subject located in the center, is also performed by the third calculation means 39, and the output of the emission amount determination means 44 is limited within a certain range based on the provisional adequate value Cc outputted from the third calculation means. This prevents the eventually determined flash emission amount to depart from the emission amount to be determined when the flash adjustment is performed according to the subject located in the center of the image. That is, the emission amount becomes slightly greater or smaller than that obtained by performing the flash adjustment according to the subject located in the center of the image, instead of the face, so that the imaging target may be imaged without halation or becoming too dark.

Further, a method that combines the aforementioned two methods may also be conceivable, in which the emission amount range is limited based on the provisional adequate value Cc, and at the same time, the upper and lower limit values determined based on the provisional adequate value Cc are restricted (adjusted) according to the provisional adequate value Cn outputted from the first calculation means so that the emission amount range is not unduly limited. This method is effective when the main subject is located in a peripheral portion of the image, instead of the center.

FIG. 22 illustrates the structure of the flash control unit 19 and input/output data for restricting the upper and lower limit values, determined based on the provisional adequate value Cc, according to the provisional adequate value Cn. In the structure illustrated in FIG. 22, the provisional adequate value Cn outputted from the first calculation means 41 is supplied to the range restriction means 37, as well as the provisional adequate value Cc outputted from the third calculation means 39.

Figure 23:
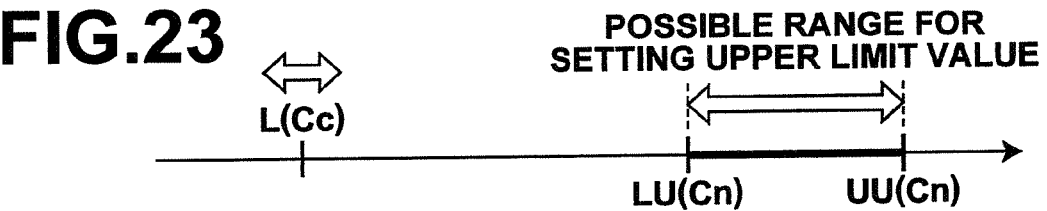
FIG. 23 illustrates an allowable setting range for upper limit value.

The range restriction means 37 restricts the value of the adequate emission amount Ch outputted from the emission amount determination means 44 within a predetermined range by setting an upper limit value U (Cc) and a lower limit value L (Cc), which vary according to the provisional adequate value Cc, on the adequate emission amount Ch, as in the range restriction means 40 illustrated in FIG. 18. Here, the range restriction means 37 restricts a possible range for setting the upper limit value as illustrated in FIG. 23.

A minimum value LU and a maximum value UU within the possible range for setting the upper limit value are determined to reasonable values empirically judging from the provisional adequate value Cn outputted from the first calculation means 41. A reasonable value determined through empirical judgment is, for example, a reasonable value as the upper limit value of flash emission amount when flash adjustment is performed without regarding the object located in the center or face. For example, the LU is set to a value obtained by adding a predetermined adjustment value to the provisional adequate value Cn, and the UU is set to a value obtained by adding another predetermined adjustment value which is greater than the adjustment value to the provisional adequate value Cn. The adjustment values added to the provisional adequate value Cn are obtained empirically by repeating flash adjustments for various subjects in advance.

Figure 24A:
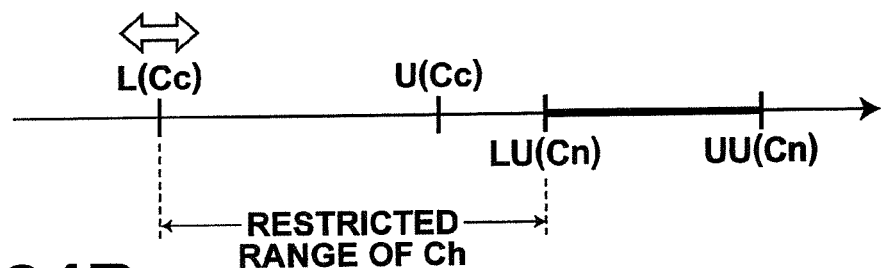
FIG. 24A illustrates the case where the upper limit value obtained by the calculation is out of the allowable setting range (smaller than the lower limit value of the allowable setting range).
Figure 24B:
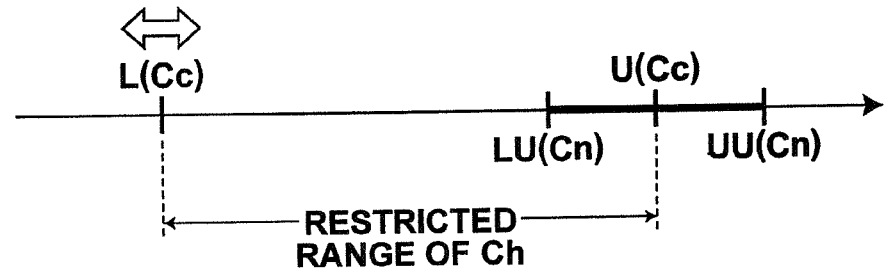
FIG. 24B illustrates the case where the upper limit value obtained by the calculation falls within the allowable setting range.
Figure 24C:
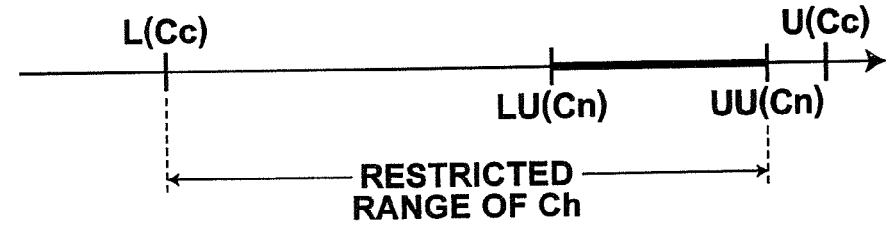
FIG. 24C illustrates the case where the upper limit value obtained by the calculation is out of the allowable setting range (greater than the lower limit value of the allowable setting range).

For example, if an object that does not require a large amount of light (e.g., object located close to the digital camera, object reflecting light strongly, object having a bright color, or the like) is located in the center of the imaging scope, the upper limit value U (Cc) determined according to the provisional adequate value Cc is relatively small. But in the present embodiment, if the upper limit value U (Cc) obtained through an arithmetic operation (e.g., U (Cc)=Cc+A) falls below the minimum value LU of the upper limit value, the upper limit value is set to the minimum value LU as illustrated in FIG. 24A. In this case, the adequate emission amount Ch is not restricted by the value of U (Cc), and may take a value within the range from the value L (Cc) to value LU. If a target that requires a moderate amount of light (e.g., object located at a moderate distance from the digital camera, object reflecting light moderately, object having a color which is neither bright nor dark, or the like) is located in the center of the imaging scope, the upper limit value U (Cc) determined according to the provisional adequate value Cc is normally set to a value which is greater than the minimum value LU of the upper limit value and smaller than the maximum value UU. In this case, the calculated upper limit value U (Cc) is directly used as the upper limit value of the adequate emission amount Ch, and the possible value for the adequate emission amount is in the range from the value L (Cc) to value U (Cc) as illustrated in FIG. 24B. If a target that requires a large amount of light (e.g., object located far from the digital camera, object absorbing light, object having a dark color in comparison with the surrounding, or the like) is located in the center of the imaging scope, the upper limit value U (Cc) determined according to the provisional adequate value Cc is relatively great. But in the present embodiment, if the upper limit value U (Cc) obtained through an arithmetic operation exceeds the maximum value UU of the upper limit value, the upper limit value is set to the maximum value UU. Thus, the adequate emission amount Ch never takes a value greater than the UU.

In the structure illustrated in FIG. 22, the emission amount required by an object located in the center of the imaging scope may influence the determination of the flash emission amount, but not too strongly. Consequently, flash imaging may be performed with adequate amount of emission in any case regardless of whether the object located in the center of the imaging scope is the intended imaging target or not, or regardless of whether the face located in the periphery is the intended imaging target or not.

In the structure describe above, the possible range for setting the upper limit value is limited also in the case where a face is located in the center of the imaging scope, but the limitation of the upper limit value to a value greater than the emission amount Cc required by the subject (face) located in the center does not mean that the emission amount required by the face is limited and does not cause any problem. The same is true if the upper limit value U (Cc) is limited to the maximum value UU or minimum value LU.

In the examples illustrated in FIGS. 23, and 24A to 24C, only the possible range for setting the upper limit value U (Cc) is limited, but it will be obvious that the possible range for setting the lower limit value L (Cc) may also be limited in the same manner as described above.

As described above, restriction of the limitation, which is provided based on the provisional adequate value Cc, according to the provisional adequate value Cn may prevent a completely failed photograph which can not be recovered by the image processing performed later, including halation and the like, regardless of whatever the subject and regardless of how much amount of light is required by the subject, and always allows quality images to be obtained. In the description above, an assumption is made of a case in which the type of the main subject is not known. But there may be a case where the type of the main subject may be assumed from the imaging mode. For example, if the selected imaging mode is "Person", it is highly likely that the main subject is a person. Thus, different values may be used for the UU and LU with respect to each imaging mode to adjust the effective level.

The method for restricting the range may includes a method that restricts the value of emission amount discretely, other than restricting the upper and lower limit values. For example, a method in which, if the emission amount obtained through an arithmetic operation differs from a particular value, the emission amount is replaced with a value which is closest to the value obtained through the arithmetic operation among particular values, may be conceivable.

So far, the present invention has been described in detail with reference to several exemplary embodiments, but the invention is not limited to these embodiments. For example, the emission amount adjustment method, that is, the process of the emission amount determination means 44 is not limited to the process using Formula (1) above, and the emission amount may be determined based on other arithmetic expressions. For example, square mean value or logarithmic mean value may be obtained instead of the weighted mean value. Further, an adjustment amount from the reference value may be fixedly predetermined, such as, for example, moving the value of the adequate emission amount to Cf side by a certain predetermined percentage from the intermediate value between the two reference values. Still further, a predetermined adjustment value may be added or subtracted from a weighted average or the like. Further, methods and digital cameras in which an adequate emission amount of the flash is determined using the provisional adequate values Cn and Cf are all belong to the technical scope of the present invention.

What is claimed is:

1. A digital camera, comprising:
   an imaging unit for generating image data representing a subject;
   a flash device for emitting a flash;
   a face region extraction unit for detecting a face included in the image data generated by the imaging unit, and outputting region information that indicates a region corresponding to the face; and
   a flash control unit for controlling emission amount of the flash using the region information outputted from the face region extraction unit, the flash control unit including:
   a first calculation means for performing a calculation on the image data generated by the imaging unit without using the region information outputted from the face region extraction unit to obtain a provisional adequate value Cn for the emission amount;
   a second calculation means for performing a calculation on the image data generated by the imaging unit using the region information outputted from the face region extraction unit to obtain a provisional adequate value Cf for the emission amount; and
   an emission amount determination means for determining an adequate emission amount Ch of the flash by performing an adjustment using the provisional adequate value Cn supplied from the first calculation means and provisional adequate value Cf supplied from the second calculation means as reference values, wherein:
   the flash control unit further comprises a parameter storage means for storing a variable parameter that indicates an influence of the provisional adequate value Cf in the adjustment; and
   the emission amount determination means calculates an average value of the provisional adequate value Cn supplied from the first calculation means, and the provisional adequate value Cf supplied from the second calculation means, in which the influence of the provisional adequate value Cf on the calculation result varies according to the value of the parameter stored in the parameter storage means.

2. The digital camera according to claim 1, wherein the value of the variable parameter stored in the parameter storage means is determined according to the ratio of the region indicated by the region information to the entire region of the image.

3. The digital camera according to claim 1, wherein the value of the variable parameter stored in the parameter storage means is determined according to the position of the region indicated by the region information.

4. The digital camera according to claim 1, wherein the value of the variable parameter stored in the parameter storage means is determined according to the inclination of the face detected by the face region extraction unit.

5. The digital camera according to claim 1, wherein the value of the variable parameter stored in the parameter storage means is determined according to the orientation of the face detected by the face region extraction unit.

6. The digital camera according to claim 1, wherein the value of the variable parameter stored in the parameter storage means is determined according to the focal length.

7. The digital camera according to claim 1, wherein:
   the digital camera further comprises a camera shake detection means; and
   the value of the variable parameter stored in the parameter storage means is determined according to the amount of camera shake detected by the camera shake detection means.

8. The digital camera according to claim 1, wherein:
   the digital camera further comprises a distance measuring means for measuring a distance from the digital camera to the subject; and
   the value of the variable parameter stored in the parameter storage means is determined according to the distance measured by the distance measuring means.

9. The digital camera according to claim 1, wherein the emission amount determination means limits possible values of the adequate emission amount Ch based on the provisional adequate value Cn.

10. The digital camera according to claim 9, wherein the emission amount determination means sets the adequate emission amount Ch to an upper limit value, which is predetermined based on the provisional adequate value Cn, when the calculation result exceeds the predetermined upper limit value, and to a lower limit value, which is predetermined based on the provisional adequate value Cn, when the calculation result falls below the predetermined lower limit value.

11. A method for controlling emission amount of a flash of a digital camera, the method comprising the steps of:
   providing, as components of the digital camera: an imaging unit for generating image data representing a subject; a flash device for emitting a flash; and a face region extraction unit for detecting a face included in the image data generated by the imaging unit and outputting region information that indicates a region corresponding to the face;
   obtaining the region information outputted from the face region extraction unit;
   causing the flash device to emit a preliminary flash emission to obtain image data representing the subject during the preliminary flash emission;
   obtaining image data representing the subject during non-flash emission immediately preceding or after the preliminary flash emission;
   performing a calculation on the image data obtained during the preliminary flash emission and on the image data obtained during the non-flash emission, without using the region information to obtain a provisional adequate value Cn for the emission amount;
   performing a calculation on the image data obtained during the preliminary flash emission and on the image data obtained during the non-flash emission, using the region information to obtain a provisional adequate value Cf for the emission amount;
   performing an adjustment using the provisional adequate value Cn and the provisional adequate value Cf to determine an adequate emission amount Ch of the flash;
   storing a variable parameter that indicates an influence of the provisional adequate value Cf in the adjustment in a parameter storage device; and
   performing control so that the emission amount of the flash is adjusted to the adequate emission amount Ch, by calculating an average value of the provisional adequate value Cn and the provisional adequate value Cf, in which the influence of the provisional adequate value Cf on the calculation result varies according to the value of the parameter stored in the parameter storage device.

12. A digital camera, comprising:
an imaging unit for generating image data representing a subject;
a flash device for emitting a flash;
a face detection unit for performing face detection on the image data generated by the imaging unit; and
a flash control unit for controlling emission amount of the flash using a detection result outputted from the face detection unit, the flash control unit including:
a calculation means for performing a calculation for each of N (integer number) faces detected by the face detection unit by regarding each face as the only face included in the image data and considering the face to obtain provisional adequate values Cfi ($1 \leq i \leq N$) for the emission amount; and
an emission amount determination means for determining an adequate emission amount Ch of the flash by performing an adjustment using the N provisional adequate values Cf1 to CfN supplied from the calculation means as reference values, wherein the emission amount determination means selects a smallest provisional adequate value from the N provisional adequate values Cf1 to CfN supplied from the calculation means, and performs the adjustment using the smallest provisional adequate value Cfmin as the reference value to determine the adequate emission amount Ch of the flash.

13. A method for controlling emission amount of a flash of a digital camera, the method comprising the steps of:
providing, as components of the digital camera: an imaging unit for generating image data representing a subject; a flash device for emitting a flash; and a face detection unit for performing face detection on the image data generated by the imaging unit;
obtaining a detection result outputted from the face detection unit;
performing a calculation for each of N (integer number) faces detected by the face detection unit by regarding each face as the only face included in the image data and considering the face in the calculation to obtain provisional adequate values Cfi ($1 \leq i \leq N$) for the emission amount; and
determining an adequate emission amount Ch of the flash by performing an adjustment using the obtained N provisional adequate values Cf1 to CfN as reference values, wherein the determining step includes selecting a smallest provisional adequate value from the N provisional adequate values Cf1 to CfN, and performing the adjustment using the smallest provisional adequate value Cfmin as the reference value.

14. A digital camera, comprising:
an imaging unit for generating image data representing a subject;
a flash device for emitting a flash;
a face detection unit for performing face detection on the image data generated by the imaging unit; and
a flash control unit for controlling emission amount of the flash using a detection result outputted from the face detection unit, the flash control unit including:
an emission amount determination means for determining an emission amount of the flash by performing a calculation process capable of setting a face consideration level as a calculation parameter in the determination of the emission amount; and
a parameter setting means for obtaining index data representing an influence level of movement of the digital camera or the subject on the determination of the emission amount, and setting the calculation parameter to a value determined based on the index data, wherein:
the emission amount determination means performs a process for obtaining the emission amount as the calculation process, based on a detection result of face detection performed on one image data set generated by the imaging unit, and a required amount of light for the subject estimated based on another image data set generated by the imaging unit; and
the parameter setting means obtains a time lag between the time point when the one image data set is generated and the time point when the another image data set is generated as the index data, and sets the calculation parameter such that the greater the time lag the smaller the face consideration level when the time lag is at least within a predetermined range.

15. The digital camera according to claim 14, wherein the parameter setting means obtains data indicating an imaging mode set in the digital camera and/or data indicating status of the digital camera as the index data.

16. The digital camera according to claim 15, wherein the parameter setting means sets the calculation parameter such that the face consideration level becomes smaller for an imaging mode and/or status in which an image shake is more likely to occur.

17. The digital camera according to claim 15, wherein the parameter setting means sets the calculation parameter such that the face consideration level becomes smaller for an imaging mode and/or status in which the time lag is estimated to become greater.

18. The digital camera according to claim 14, wherein:
the digital camera further comprises a time measuring means for measuring the time lag; and
the parameter setting means obtains data representing the time lag provided by the time measuring means.

19. The digital camera according to claim 14, wherein the parameter setting means obtains data representing a ratio of the face detected by the face detection means to the entire image as the index data, and sets the calculation parameter such that the smaller the ratio the smaller the face consideration level when the ratio is at least within a predetermined range.

20. The digital camera according to claim 14, wherein the parameter setting means obtains data representing a focal length as the index data, and sets the calculation parameter such that the longer the focal length the smaller the face consideration level when the focal length is at least within a predetermined range.

21. The digital camera according to claim 14, wherein:
the digital camera further comprises a camera shake detection means; and
the parameter setting means obtains data representing an amount of shake detected by the camera shake detection means, and sets the calculation parameter such that the greater the amount of the shake the smaller the face consideration level when the amount of the shake is at least within a predetermined range.

* * * * *